United States Patent
Yokoyama

(10) Patent No.: US 11,422,329 B2
(45) Date of Patent: Aug. 23, 2022

(54) IMAGING OPTICAL SYSTEM, IMAGING APPARATUS, STEREO CAMERA, DISTANCE MEASURING APPARATUS, AND MOBILE OBJECT

(71) Applicant: Ricoh Company, Ltd., Tokyo (JP)

(72) Inventor: Yukihisa Yokoyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 280 days.

(21) Appl. No.: 16/918,163

(22) Filed: Jul. 1, 2020

(65) Prior Publication Data

US 2021/0011249 A1 Jan. 14, 2021

(30) Foreign Application Priority Data

Jul. 8, 2019 (JP) .............................. JP2019-126855

(51) Int. Cl.
*G02B 7/02* (2021.01)
*G02B 9/08* (2006.01)
(Continued)

(52) U.S. Cl.
CPC .............. *G02B 7/028* (2013.01); *G02B 9/08* (2013.01); *G01C 15/002* (2013.01); *G02B 13/0045* (2013.01); *G03B 35/00* (2013.01)

(58) Field of Classification Search
CPC .. G02B 13/00; G02B 15/142; G02B 15/1421; G02B 9/60; G02B 9/32; G02B 9/06
(Continued)

(56) References Cited

U.S. PATENT DOCUMENTS

2007/0139793 A1 6/2007 Kawada
2014/0009555 A1 1/2014 Itami et al.
(Continued)

FOREIGN PATENT DOCUMENTS

JP 2007-101920 4/2007
JP 2014-089349 5/2014
(Continued)

OTHER PUBLICATIONS

Extended European Search Report dated Nov. 2, 2020 in European Patent Application No. 20183442.1, 11 pages.
(Continued)

*Primary Examiner* — Thomas K Pham
*Assistant Examiner* — Kuei-Jen L Edenfield
(74) *Attorney, Agent, or Firm* — Xsensus LLP

(57) ABSTRACT

An imaging optical system includes, sequentially from an object side toward an image side, a first lens group; an aperture stop; and a second lens group. The first lens group includes a negative lens; and a positive lens formed of a plastic lens. The second lens group includes a plastic lens and satisfies Conditional Expressions (1) and (2) as follows:

$$c31a > c32a, \text{ and} \quad (1)$$
$$c31b < c32b, \quad (2)$$

where
$c31a$ is an on-axis curvature of an object-side surface of the plastic lens of the second lens group,
$c32a$ is an on-axis curvature of an image-side surface of the plastic lens of the second lens group,
$c31b$ is an off-axis curvature of the object-side surface of the plastic lens of the second lens group, and
$c32b$ is an off-axis curvature of the image-side surface of the plastic lens of the second lens group.

16 Claims, 25 Drawing Sheets

(51) Int. Cl.
*G01C 15/00* (2006.01)
*G02B 13/00* (2006.01)
*G03B 35/00* (2021.01)

(58) Field of Classification Search
USPC .................................. 359/746, 691, 736, 717
See application file for complete search history.

(56) References Cited

U.S. PATENT DOCUMENTS

| | | | |
|---|---|---|---|
| 2014/0049838 A1* | 2/2014 | Tang | G02B 27/0025 359/714 |
| 2014/0204166 A1 | 7/2014 | Itami et al. | |
| 2015/0097910 A1 | 4/2015 | Itami et al. | |
| 2015/0268462 A1 | 9/2015 | Itami et al. | |
| 2015/0338641 A1 | 11/2015 | Yokoyama | |
| 2015/0346487 A1 | 12/2015 | Miyatake et al. | |
| 2016/0147060 A1 | 5/2016 | Itami et al. | |
| 2018/0341089 A1 | 11/2018 | Nakamura et al. | |
| 2019/0155006 A1* | 5/2019 | Lin | G02B 13/06 |

FOREIGN PATENT DOCUMENTS

| | | |
|---|---|---|
| JP | 2016-142767 | 8/2016 |
| JP | 2018-055045 | 4/2018 |

OTHER PUBLICATIONS

Kasarova, S.N., et al.. "Temperature dependence of refractive characteristics of optical plastics", Journal of Physics: Conference Series, 16 ISCMP: Progress in Solid State and Molecular Electronics. Ionics and Photonics, vol. 253, No. 1, Dec. 7, 2010, XP020200641, pp. 1-6.

* cited by examiner

| SURFACE NUMBER | r | d | Nd | γd |
|---|---|---|---|---|
| 1 | 12.182 | 1.000 | 1.5163 | 64.14 |
| 2 | 4.191 | 2.395 | | |
| 3* | -6.882 | 2.684 | 1.6397 | 23.52 |
| 4* | -4.638 | 3.299 | | |
| 5 | ∞ | 1.162 | | |
| 6* | 67.910 | 1.000 | 1.6397 | 23.52 |
| 7* | 3.455 | 0.317 | | |
| 8 | 8.715 | 2.292 | 1.5952 | 67.74 |
| 9 | -5.038 | 0.200 | | |
| 10* | 26.936 | 2.687 | 1.5370 | 55.99 |
| 11* | -5.701 | 1.046 | | |
| 12 | ∞ | 1.100 | 1.5163 | 64.14 |
| 13 | ∞ | 2.500 | | |
| 14 | ∞ | 0.400 | 1.5163 | 64.14 |
| 15 | ∞ | 1.620 | | |

* REPRESENTS ROTATIONALLY SYMMETRIC ASPHERICAL SURFACE

FIG. 3

| SURFACE NUMBER | k | A4 | A6 | A8 | A10 | A12 | A14 | A16 |
|---|---|---|---|---|---|---|---|---|
| 3 | 2.0511 | 2.8420E-03 | 7.3741E-05 | -3.2431E-06 | 1.1186E-08 | 2.3525E-08 | | |
| 4 | 0.1854 | 3.3185E-03 | 4.9225E-05 | -7.6062E-06 | 6.5460E-07 | -1.0420E-08 | | |
| 6 | 98.9978 | -5.8578E-03 | 1.5811E-04 | -2.6718E-04 | 6.1936E-05 | -3.3808E-06 | | |
| 7 | -1.6697 | -6.3247E-03 | -1.6511E-04 | 3.5109E-05 | 3.6512E-06 | -3.5070E-07 | | |
| 10 | -40.0980 | -2.5201E-03 | -1.7080E-04 | -4.0557E-05 | 3.7339E-06 | -5.0503E-07 | | |
| 11 | 1.0722 | -4.2094E-04 | -5.5769E-05 | -3.1340E-06 | 6.4812E-09 | -5.2836E-09 | | |

FIG. 8

| SURFACE NUMBER | r | d | Nd | γd |
|---|---|---|---|---|
| 1 | 6.004 | 2.699 | 1.7725 | 49.60 |
| 2 | 2.762 | 1.780 | | |
| 3* | -4.941 | 2.684 | 1.6397 | 23.52 |
| 4* | -4.593 | 1.517 | | |
| 5 | ∞ | 2.667 | | |
| 6 | 10.606 | 2.698 | 1.6516 | 58.55 |
| 7 | -5.000 | 0.200 | | |
| 8* | -2.903 | 1.000 | 1.6397 | 23.52 |
| 9* | -6.479 | 0.366 | | |
| 10* | 49.676 | 2.313 | 1.5370 | 55.99 |
| 11* | -4.645 | 0.275 | | |
| 12 | ∞ | 1.100 | 1.5163 | 64.14 |
| 13 | ∞ | 2.500 | | |
| 14 | ∞ | 0.400 | 1.5163 | 64.14 |
| 15 | ∞ | 1.500 | | |

* REPRESENTS ROTATIONALLY SYMMETRIC ASPHERICAL SURFACE

FIG. 9

| SURFACE NUMBER | k | A4 | A6 | A8 | A10 | A12 | A14 | A16 |
|---|---|---|---|---|---|---|---|---|
| 3 | -0.0560 | 4.9136E-03 | -2.3169E-05 | -1.0694E-05 | 1.5514E-05 | -4.0447E-06 | 3.1055E-07 | |
| 4 | 2.0582 | 5.9431E-03 | 3.0296E-04 | -1.9529E-06 | 1.8641E-05 | -5.5175E-06 | 6.7396E-07 | |
| 8 | -7.5193 | 7.6016E-03 | -2.8386E-03 | 9.6630E-04 | -2.5020E-04 | 2.3559E-05 | 1.1613E-06 | -2.4806E-07 |
| 9 | -4.8706 | 5.7711E-02 | -2.3825E-02 | 9.1173E-03 | -2.4546E-03 | 4.0005E-04 | -3.5387E-05 | 1.3114E-06 |
| 10 | 10.0006 | 2.1997E-02 | -1.5469E-02 | 5.5731E-03 | -1.3257E-03 | 1.8608E-04 | -1.4085E-05 | 4.3290E-07 |
| 11 | 1.3146 | -2.5084E-03 | 3.4954E-04 | -9.4873E-05 | 6.2292E-06 | 1.7250E-06 | -3.2565E-07 | 1.6541E-08 |

FIG. 14

| SURFACE NUMBER | r | d | Nd | γd |
|---|---|---|---|---|
| 1 | 6.762 | 1.000 | 1.5163 | 64.14 |
| 2 | 4.495 | 3.041 | | |
| 3* | -3.840 | 2.078 | 1.6397 | 23.52 |
| 4* | -3.902 | 4.318 | | |
| 5 | ∞ | 1.537 | | |
| 6* | -21.872 | 1.000 | 1.6397 | 23.52 |
| 7* | 4.611 | 0.205 | | |
| 8 | 10.923 | 2.114 | 1.5952 | 67.74 |
| 9 | -5.948 | 0.200 | | |
| 10* | 4.559 | 2.683 | 1.5370 | 55.99 |
| 11* | -15.512 | 0.904 | | |
| 12 | ∞ | 1.100 | 1.5163 | 64.14 |
| 13 | ∞ | 1.500 | | |
| 14 | ∞ | 0.400 | 1.5163 | 64.14 |
| 15 | ∞ | 1.620 | | |

\* REPRESENTS ROTATIONALLY SYMMETRIC ASPHERICAL SURFACE

FIG. 15

| SURFACE NUMBER | k | A4 | A6 | A8 | A10 | A12 | A14 | A16 |
|---|---|---|---|---|---|---|---|---|
| 3 | -0.0884 | 4.0599E-03 | 5.3697E-05 | -2.1642E-06 | 1.5932E-08 | 3.0416E-08 | | |
| 4 | -0.3073 | 2.8915E-03 | 5.9667E-05 | -9.4432E-06 | 7.5816E-07 | -1.6356E-08 | | |
| 6 | -10.0000 | -8.7135E-03 | -1.9620E-04 | 2.0172E-04 | -5.9184E-05 | 5.7937E-06 | | |
| 7 | -4.2834 | -5.8247E-03 | -4.4860E-05 | 1.0536E-04 | -1.5783E-05 | 7.9878E-07 | | |
| 10 | 0.3735 | 1.4085E-04 | -4.7263E-05 | 2.2510E-06 | 2.6585E-07 | 3.6387E-09 | | |
| 11 | -6.8148 | 4.1158E-03 | 8.0489E-07 | 7.5937E-05 | -1.1594E-05 | 9.7704E-07 | | |

FIG. 20

| SURFACE NUMBER | r | d | Nd | γd |
|---|---|---|---|---|
| 1 | 7.729 | 2.699 | 1.9165 | 31.60 |
| 2 | 2.905 | 1.595 | | |
| 3* | -4.494 | 2.684 | 1.6397 | 23.52 |
| 4* | -3.521 | 3.874 | | |
| 5 | ∞ | 0.285 | | |
| 6 | 7.376 | 1.878 | 1.5378 | 74.70 |
| 7 | -4.475 | 0.226 | | |
| 8* | -2.739 | 1.451 | 1.6397 | 23.52 |
| 9* | -5.890 | 1.015 | | |
| 10* | ∞ | 2.074 | 1.5370 | 55.99 |
| 11* | -5.194 | 0.200 | | |
| 12 | ∞ | 1.100 | 1.5163 | 64.14 |
| 13 | ∞ | 2.500 | | |
| 14 | ∞ | 0.400 | 1.5163 | 64.14 |
| 15 | ∞ | 1.500 | | |

\* REPRESENTS ROTATIONALLY SYMMETRIC ASPHERICAL SURFACE

FIG. 21

| SURFACE NUMBER | k | A4 | A6 | A8 | A10 | A12 | A14 | A16 |
|---|---|---|---|---|---|---|---|---|
| 3 | 0.1911 | 1.4340E-03 | 4.8024E-04 | -1.6814E-04 | 3.2313E-05 | -2.6673E-06 | | |
| 4 | -0.2632 | 2.1208E-03 | 7.2585E-05 | -2.2179E-05 | 2.7460E-06 | -1.9184E-07 | | |
| 8 | -5.0120 | 1.3012E-02 | -3.9555E-03 | 3.3967E-04 | -6.5952E-06 | -3.9835E-07 | | |
| 9 | -6.6077 | 4.1415E-02 | -7.3372E-03 | 2.4820E-04 | 3.8634E-05 | -3.2621E-06 | | |
| 10 | -10.0000 | 1.9522E-02 | -5.9370E-03 | 6.5731E-04 | -3.7567E-05 | -4.1229E-06 | | |
| 11 | 1.1920 | 2.3368E-03 | -4.8304E-04 | 1.2687E-06 | -2.3384E-06 | 1.8412E-08 | | |

IMAGING OPTICAL SYSTEM, IMAGING APPARATUS, STEREO CAMERA, DISTANCE MEASURING APPARATUS, AND MOBILE OBJECT

CROSS-REFERENCE TO RELATED APPLICATIONS

This patent application is based on and claims priority pursuant to 35 U.S.C. § 119(a) to Japanese Patent Application No. 2019-126855, filed on Jul. 8, 2019, in the Japan Patent Office, the entire disclosure of which is hereby incorporated by reference herein.

BACKGROUND

Technical Field

The present disclosure relates to an imaging optical system, an imaging apparatus, a stereo camera, a distance measuring apparatus, and a mobile object

Description of the Related Art

Many camera apparatuses that include an imaging optical system and an area sensor, such as a monitoring camera for sensing and an on-vehicle camera to identify an object, are hitherto in practical use and demands for such camera apparatuses increase.

Moreover, imaging optical systems that use plastic lenses reduced in cost and weight through quantity production are in practical use in recent years. Plastic lenses, however, typically have a disadvantage of hardly having stable characteristics in a wide temperature range in accordance with the properties thereof. In particular, for stereo camera apparatuses, when a variation in angle of view or a variation in image height at a temperature change increases, an error in distance measurement increases. Thus, it is desirable to optically reduce a variation in angle of view to a small value when an ambient temperature changes.

SUMMARY

An imaging optical system according to an embodiment of the present disclosure includes, sequentially from an object side toward an image side, a first lens group having one of a positive refractive power and a negative refractive power; an aperture stop; and a second lens group having a positive refractive power. The first lens group includes, sequentially from the object side toward the image side, a negative lens having a meniscus shape; and a positive lens having a meniscus shape and formed of a plastic lens. The second lens group includes a plastic lens and satisfies Conditional Expressions (1) and (2) as follows:

$$c31a > c32a, \text{ and} \quad (1)$$

$$c31b < c32b, \quad (2)$$

where
$c31a$ is an on-axis curvature of an object-side surface of the plastic lens of the second lens group,
$c32a$ is an on-axis curvature of an image-side surface of the plastic lens of the second lens group,
$c31b$ is an off-axis curvature of the object-side surface of the plastic lens of the second lens group, and
$c32b$ is an off-axis curvature of the image-side surface of the plastic lens of the second lens group.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 3 is a table presenting aspherical data of aspherical lenses of the imaging optical system according to Numerical Example 1;

FIG. 8 is a table presenting data of respective optical surfaces of the imaging optical system according to Numerical Example 2;

FIG. 9 is a table presenting aspherical data of aspherical lenses of the imaging optical system according to Numerical Example 2;

FIG. 14 is a table presenting data of respective optical surfaces of the imaging optical system according to Numerical Example 3;

FIG. 15 is a table presenting aspherical data of aspherical lenses of the imaging optical system according to Numerical Example 3;

FIG. 20 is a table presenting data of respective optical surfaces of the imaging optical system according to Numerical Example 4;

FIG. 21 is a table presenting aspherical data of aspherical lenses of the imaging optical system according to Numerical Example 4;

Figures 1, 2:
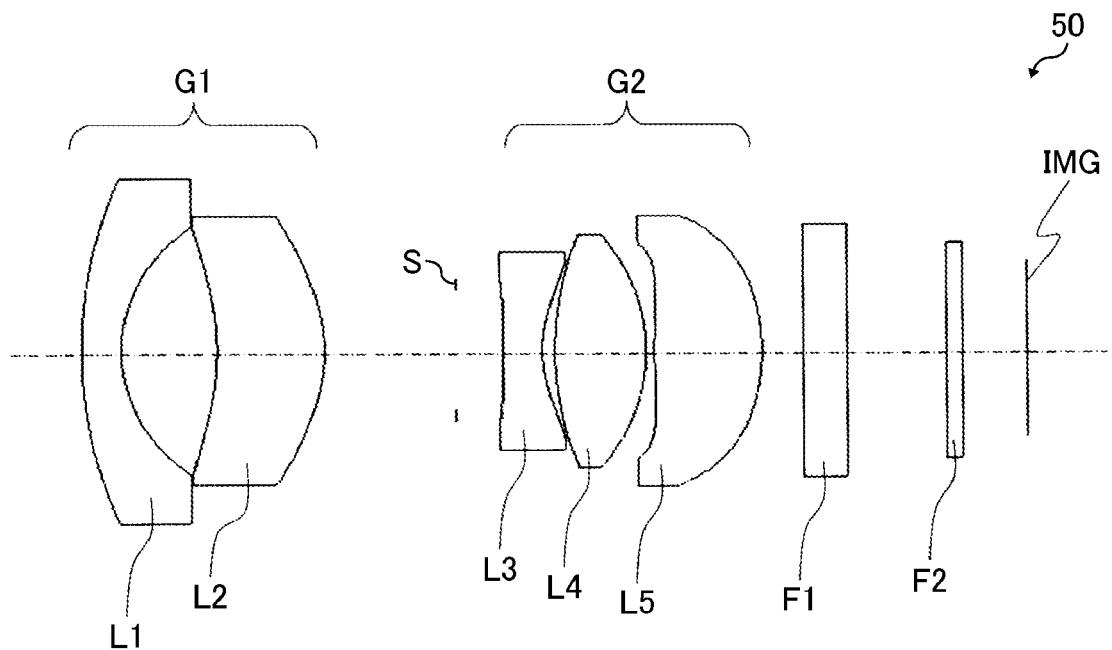
FIG. 1 is a cross-sectional view illustrating a lens configuration of an imaging optical system according to Numerical Example 1.
FIG. 2 is a table presenting data of respective optical surfaces of the imaging optical system according to Numerical Example 1.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An imaging optical system 50 according to an embodiment includes, sequentially from an object side toward an image side, a first lens group having one of a positive refractive power and a negative refractive power, an aperture stop; and a second lens group having a positive refractive power. The first lens group includes, sequentially from the object side toward the image side, a negative lens having a meniscus shape, and a positive lens having a meniscus shape and formed of a plastic lens. The second lens group includes a plastic lens and satisfies Conditional Expressions (1) and (2) as follows:

$$c31a > c32a, \text{ and} \quad (1)$$

$$c31b < c32b, \quad (2)$$

where $c31a$ is an on-axis curvature of an object-side surface of the plastic lens of the second lens group, $c32a$ is an on-axis curvature of an image-side surface of the plastic lens of the second lens group, $c31b$ is an off-axis curvature of the object-side surface of the plastic lens of the second lens group, and $c32b$ is an off-axis curvature of the image-side surface of the plastic lens of the second lens group.

"An on-axis curvature" represents, for example, a local curvature at a position close to an optical axis. "An off-axis curvature" represents a local curvature at a lens height of smaller one of an effective diameter at an outermost end of an object-side surface and an effective diameter at an outermost end of an image-side surface.

The imaging optical system 50 according to the present embodiment can satisfy Conditional Expressions (3) and (4) as follows:

$$\alpha 2 > 30 \times 10^{-6}, \text{ and} \quad (3)$$

$$\alpha 3 > 30 \times 10^{-6}, \quad (4)$$

where $\alpha 2$ is a coefficient of linear expansion of the positive lens of the first lens group, and $\alpha 3$ is a coefficient of linear expansion of the plastic lens of the second lens group.

The imaging optical system 50 according to the present embodiment can satisfy Conditional Expressions (5) and (6) as follows:

$$\beta 2 < -50 \times 10^{-6}, \text{ and} \quad (5)$$

$$\beta 3 < -50 \times 10^{-6}, \quad (6)$$

where $\beta 2$ is a temperature coefficient of a refractive index of the positive lens of the first lens group, and $\beta 3$ is a temperature coefficient of a refractive index of the plastic lens of the second lens group.

"A temperature coefficient of a refractive index" represents, for example, a value of a temperature coefficient of a relative refractive index in an ambient air in a range of from 20° C. to 40° C. for the d-line.

The imaging optical system 50 according to the present embodiment can satisfy Conditional Expression (7) as follows:

$$0.2 < \varphi 2a/\varphi 3a < 0.8, \quad (7)$$

where

φ2a is an on-axis power of the positive lens of the first lens group, and

φ3a is an on-axis power of the plastic lens of the second lens group.

The imaging optical system 50 according to the present embodiment can satisfy Conditional Expression (8) as follows:

$$\varphi 2a + \varphi 3a < \varphi A, \quad (8)$$

where

φ2a is an on-axis power of the positive lens of the first lens group,

φ3a is an on-axis power of the plastic lens of the second lens group, and

φA is an on-axis power of a whole system of the optical system.

The imaging optical system 50 according to the present embodiment can satisfy Conditional Expression (9) as follows:

$$|c31a - c32a| < |c31b - c32b|. \quad (9)$$

Imaging optical systems 50 according to Numerical Example 1 to Numerical Example 4 are described first in detail. Hereinafter, r denotes a curvature radius, d denotes a surface distance, Nd denotes a refractive index, and νd denotes an Abbe number. "$E^{-a}$" represents "$\times 10^{-a}$". An F-line (λ=486.1 nm), a d-line (λ=587.6 nm), and a C-line (λ=656.3 nm) denote aberrations for respective wavelengths, S denotes a sagittal image surface, and M denotes a meridional image surface. f denotes a focal length of a whole system, Fno denotes a full-aperture F-number, θ denotes a half angle of view, and Y denotes a maximum image height. The unit of length is millimeter (mm).

A rotationally symmetric aspherical surface is defined by the following equation: $x = cy^2/[1 + [1 - (1+K)c^2y^2]^{1/2}] + A4y^4 + A6y^6 + A8y^8 + A10y^{10} + A12y^{12} \ldots$, (where c is a curvature (1/r), y is a height from an optical axis, K is a conical constant, and A4, A6, A8, . . . are aspherical coefficients of respective orders).

Figure 4:
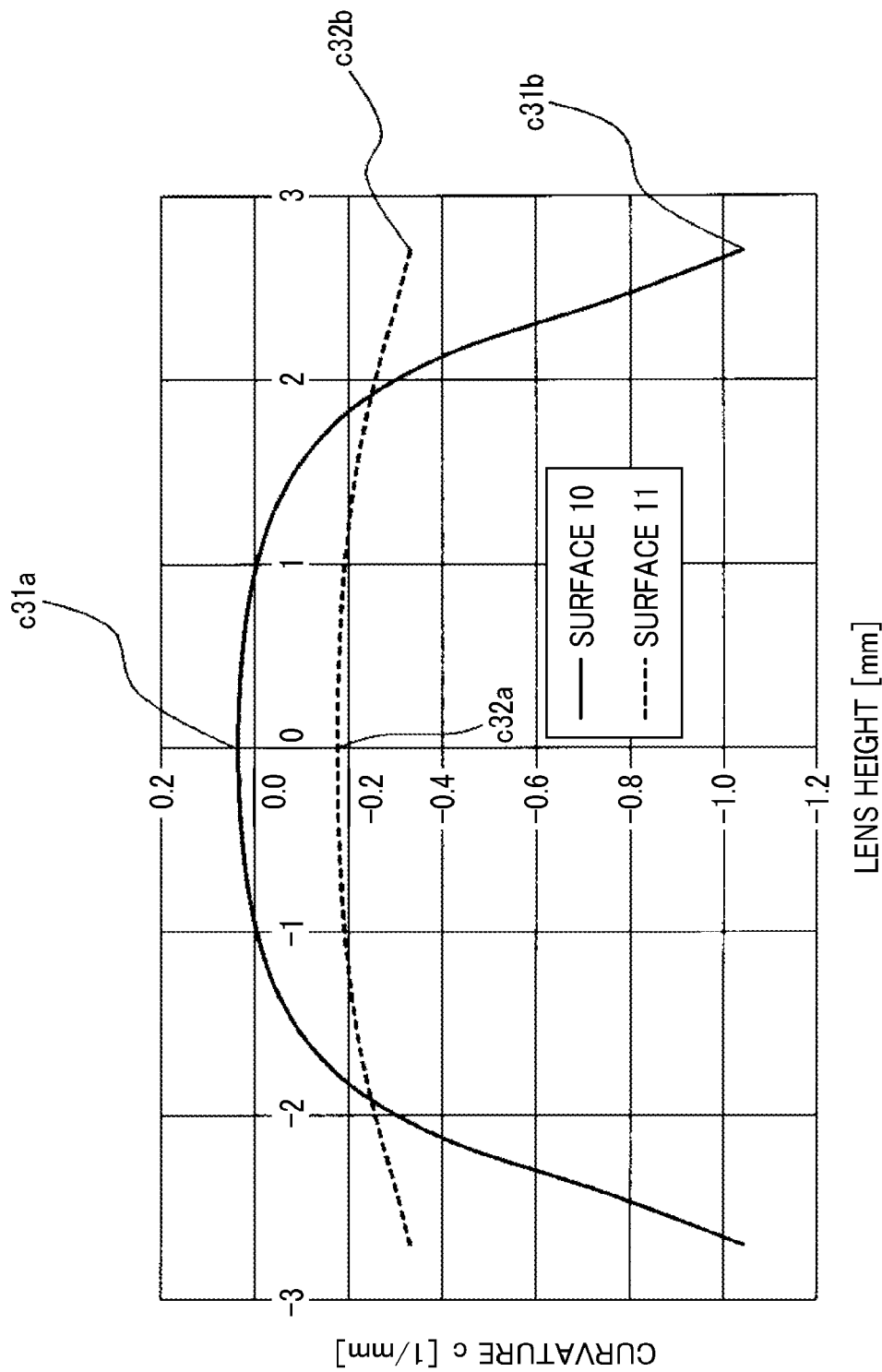
FIG. 4 is a graph presenting a transition of curvature from an on-axis position to an off-axis position of each of an object-side surface and an image-side surface of a plastic lens located closest to an image side of a second lens group in the imaging optical system according to Numerical Example 1.
Figure 5:
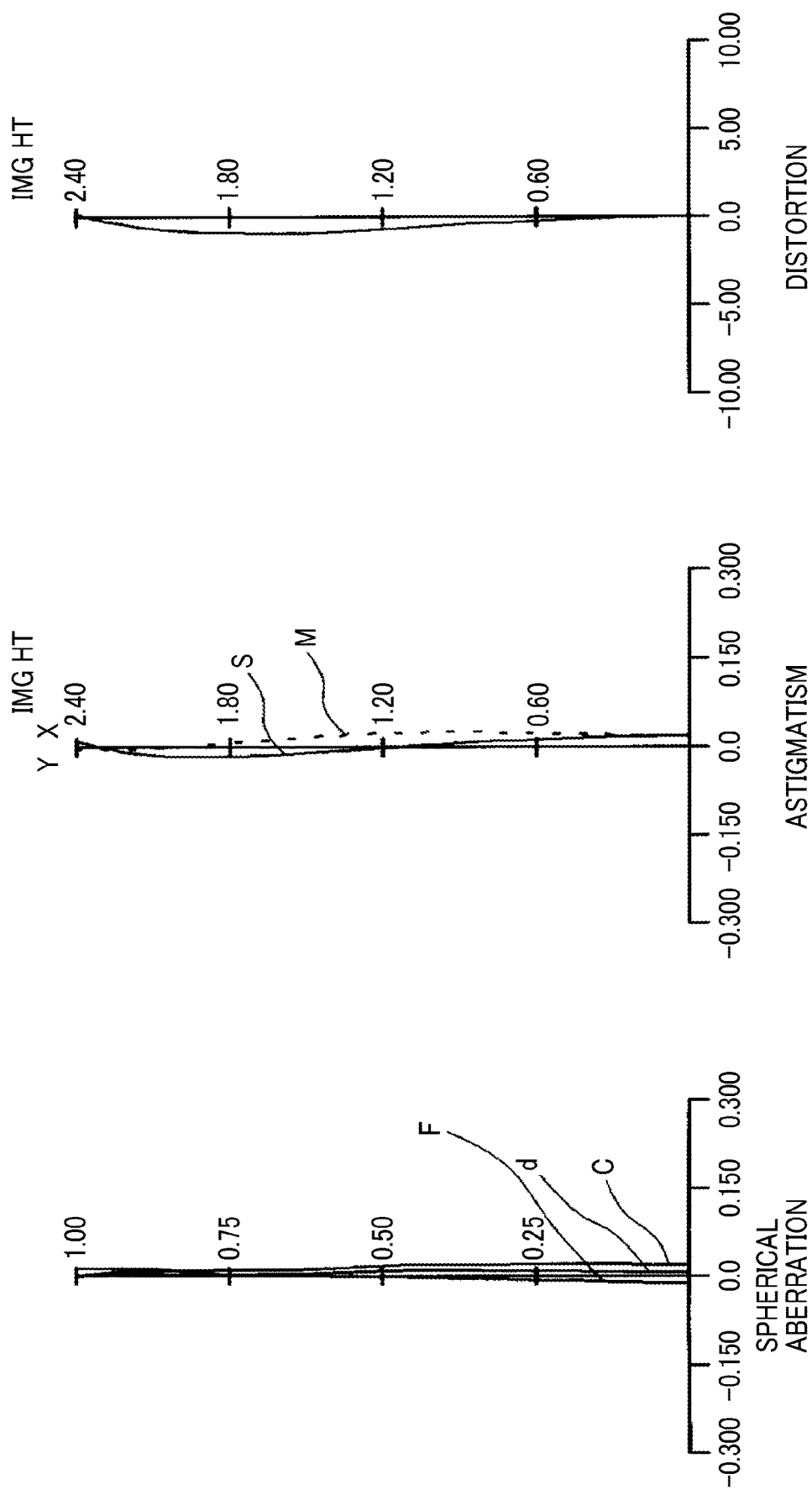
FIG. 5 provides graphs presenting spherical aberration, astigmatism, and distortion of the imaging optical system according to Numerical Example 1.
Figure 6:
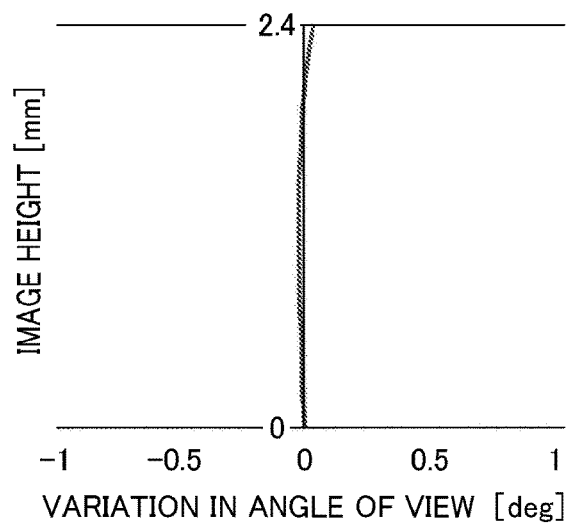
FIG. 6 illustrates a variation in angle of view at a temperature change of a ray that reaches each image height of the imaging optical system according to Numerical Example 1.

FIG. 1 is a cross-sectional view illustrating a lens configuration of an imaging optical system 50 according to Numerical Example 1. FIG. 2 is a table presenting data of respective optical surfaces of the imaging optical system 50 according to Numerical Example 1. FIG. 3 is a table presenting aspherical data of aspherical lenses of the imaging optical system 50 according to Numerical Example 1. FIG. 4 is a graph presenting a transition of curvature from an on-axis position to an off-axis position of each of an object-side surface and an image-side surface of a plastic lens located closest to an image side of a second lens group in the imaging optical system 50 according to Numerical Example 1 (c31b and c32b are values of lens effective diameters corresponding to an outermost end of 2.7 mm). FIG. 5 provides graphs presenting spherical aberration, astigmatism, and distortion of the imaging optical system 50 according to Numerical Example 1. FIG. 6 illustrates a variation in angle of view at a temperature change of a ray that reaches each image height of the imaging optical system 50 according to Numerical Example 1.

As illustrated in FIG. 1, the imaging optical system 50 of Numerical Example 1 includes, sequentially from an object side toward an image side, a first lens group G1 having a positive refractive power, an aperture stop S, and a second lens group G2 having a positive refractive power. Reference sign IMG denotes an image surface in terms of design.

Filter glasses are disposed between the second lens group G2 and the image surface IMG. The filter glasses represent various filters, such as an optical low-pass filter, an infrared-cut filter, and an ultraviolet-cut filter; and a cover glass (seal glass) for a light receiving element, as optically equivalent parallel plates. In an imaging optical system 50 of a type using a solid-state imaging element, such as a charge-coupled device (CCD) sensor or a complementary metal-oxide semiconductor (CMOS) sensor, at least one of a back insertion glass, a low-pass filter, a cut filter, a cover glass that protects a light receiving surface of the solid-state imaging element, and the like, is inserted. An example case where first and second optical filters F1 and F2, as two parallel plates among the above-listed components, are inserted between the second lens group G2 and the image surface IMG is described here. However, insertion or non-insertion of an optical filter and the number of inserted optical filters are not limited to those of the example.

The first lens group G1 includes, sequentially from the object side toward the image side, a lens L1 and a lens L2. The second lens group G2 includes, sequentially from the object side toward the image side, a lens L3, a lens L4, and a lens L5.

The lens L1 has a meniscus shape having a negative power and having a convex surface facing the object side. The lens L2 has a meniscus shape having a positive power and having a concave surface facing the object side. The lens L3 has a biconcave shape having a negative power. The lens L4 has a biconvex shape having a positive power. The lens L5 has a biconvex shape having a positive power at an on-axis position thereof, and also having a meniscus shape having a negative power at an off-axis position thereof and having a concave surface facing the object side (the lens L5 has a point of inflection in a way from the on-axis position to the off-axis position). The lens L1 uses a glass lens, the lens L2 uses a plastic lens, the lens L3 uses a plastic lens, the lens L4 uses a glass lens, and the lens L5 uses a plastic lens.

In Numerical Example 1, whole-system focal length f=4.29 (mm), full-aperture F-number Fno=1.90, half angle of view θ=29.2 (deg), and maximum image height Y=2.4 (mm) are established.

Figure 7:
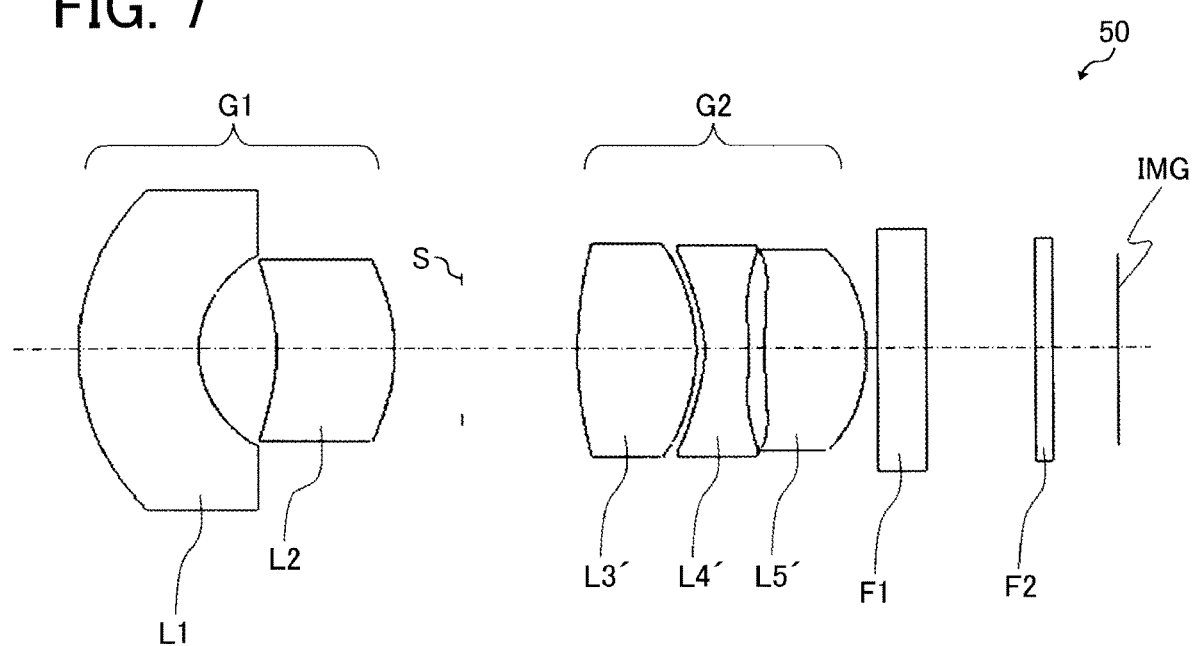
FIG. 7 is a cross-sectional view illustrating a lens configuration of an imaging optical system according to Numerical Example 2.
Figure 10:
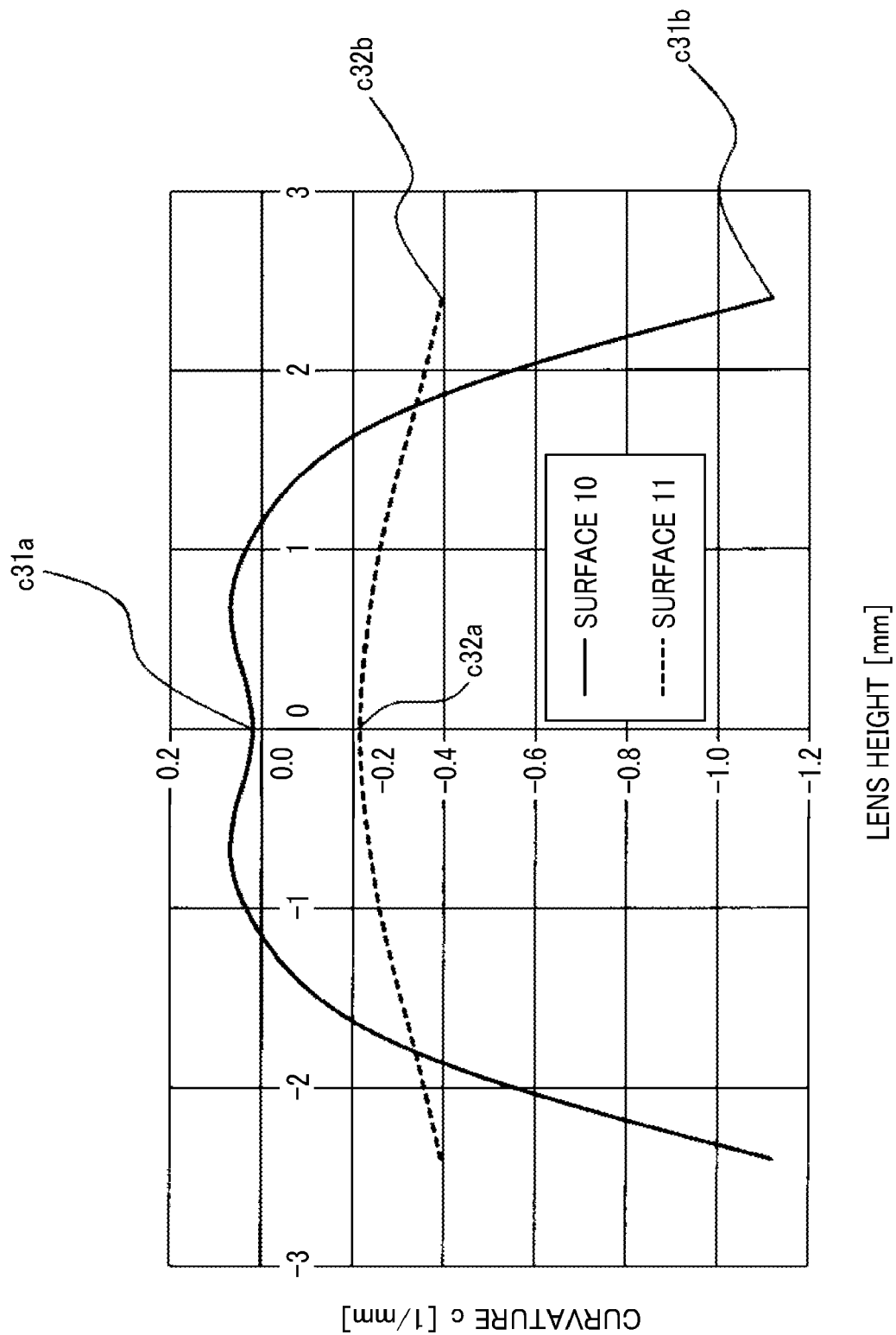
FIG. 10 is a graph presenting a transition of curvature from an on-axis position to an off-axis position of each of an object-side surface and an image-side surface of a plastic lens located closest to an image side of a second lens group in the imaging optical system according to Numerical Example 2.
Figure 11:
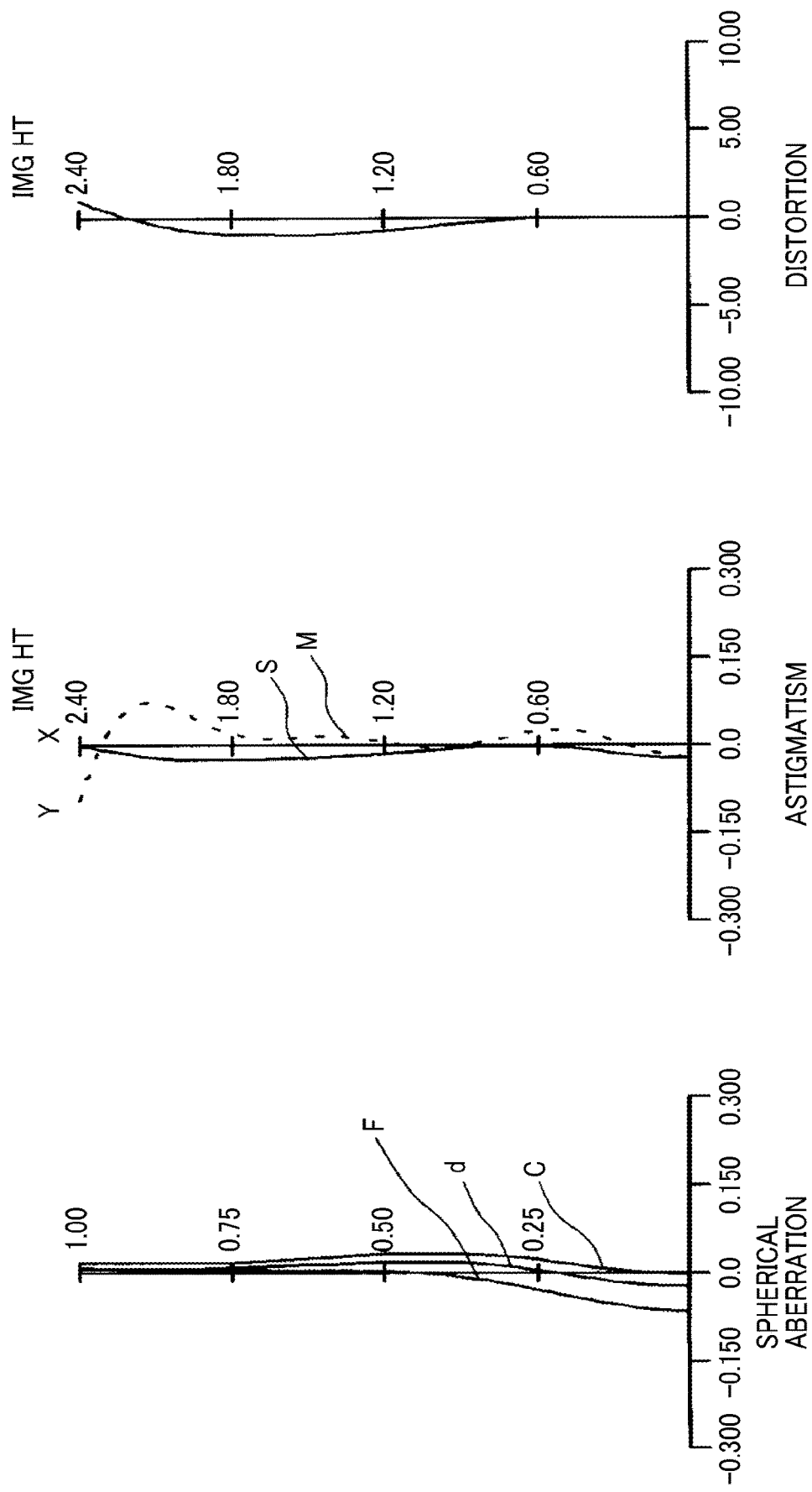
FIG. 11 provides graphs presenting spherical aberration, astigmatism, and distortion of the imaging optical system according to Numerical Example 2.
Figure 12:
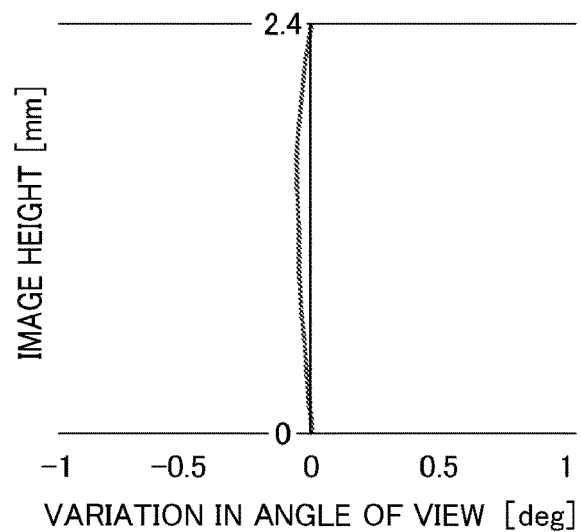
FIG. 12 illustrates a variation in angle of view at a temperature change of a ray that reaches each image height of the imaging optical system according to Numerical Example 2.

FIG. 7 is a cross-sectional view illustrating a lens configuration of an imaging optical system 50 according to Numerical Example 2. FIG. 8 is a table presenting data of respective optical surfaces of the imaging optical system 50 according to Numerical Example 2. FIG. 9 is a table presenting aspherical data of aspherical lenses of the imaging optical system 50 according to Numerical Example 2. FIG. 10 is a graph presenting a transition of curvature from an on-axis position to an off-axis position of each of an object-side surface and an image-side surface of a plastic lens located closest to an image side of a second lens group in the imaging optical system 50 according to Numerical Example 2 (c31b and c32b are values of lens effective diameters corresponding to an outermost end of 2.4 mm). FIG. 11 provides graphs presenting spherical aberration, astigmatism, and distortion of the imaging optical system 50 according to Numerical Example 2. FIG. 12 illustrates a variation in angle of view at a temperature change of a ray that reaches each image height of the imaging optical system 50 according to Numerical Example 2.

As illustrated in FIG. 7, the imaging optical system 50 of Numerical Example 2 includes, sequentially from an object side toward an image side, a first lens group G1 having a negative refractive power, an aperture stop S, and a second lens group G2 having a positive refractive power. Reference sign IMG denotes an image surface in terms of design. First and second optical filters F1 and F2 are provided between the second lens group G2 and the image surface IMG.

The first lens group G1 includes, sequentially from the object side toward the image side, a lens L1 and a lens L2. The second lens group G2 includes, sequentially from the object side toward the image side, a lens L3', a lens L4', and a lens L5'.

The lens L1 has a meniscus shape having a negative power and having a convex surface facing the object side. The lens L2 has a meniscus shape having a positive power and having a concave surface facing the object side. The lens L3' has a biconvex shape having a positive power. The lens L4' has a biconcave shape having a negative power. The lens L5' has a biconvex shape having a positive power at an on-axis position thereof, and also having a meniscus shape having a negative power at an off-axis position thereof and having a concave surface facing the object side (the lens L5' has a point of inflection in a way from the on-axis position to the off-axis position). The lens L1 uses a glass lens, the lens L2 uses a plastic lens, the lens L3 uses a glass lens, the lens L4 uses a plastic lens, and the lens L5 uses a plastic lens.

In Numerical Example 2, whole-system focal length f=4.29 (mm), full-aperture F-number Fno=1.90, half angle of view θ=29.2 (deg), and maximum image height Y=2.4 (mm) are established.

Figure 13:
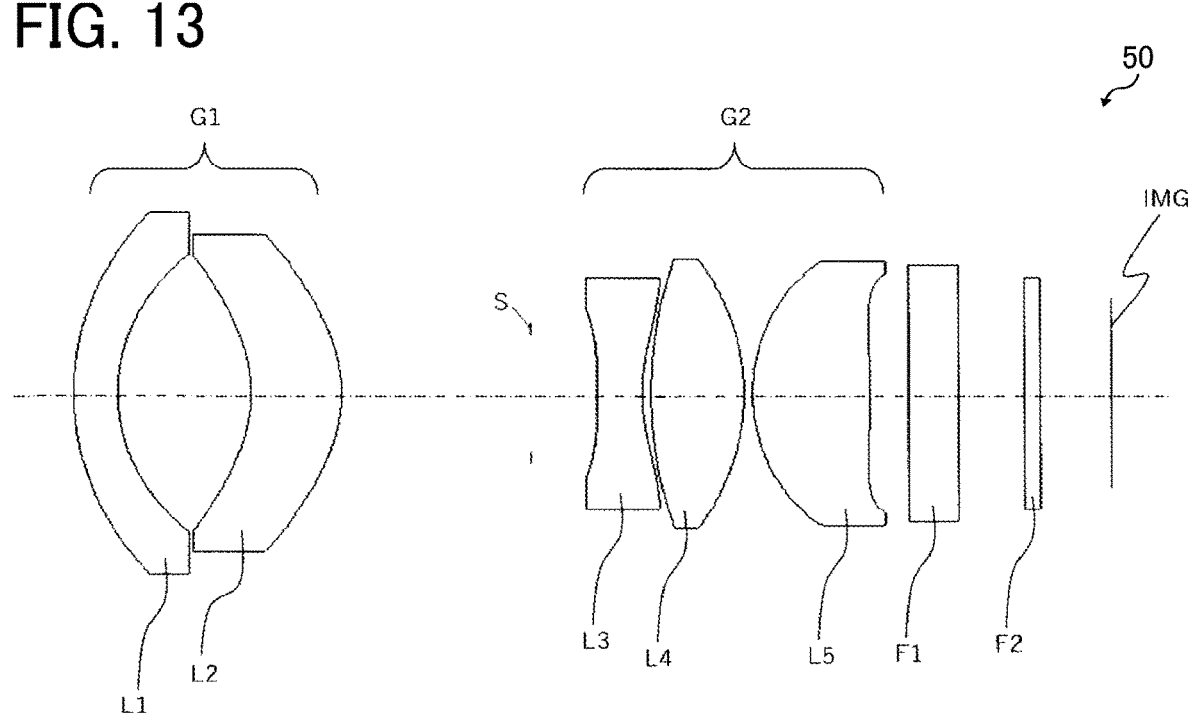
FIG. 13 is a cross-sectional view illustrating a lens configuration of an imaging optical system according to Numerical Example 3.
Figure 16:
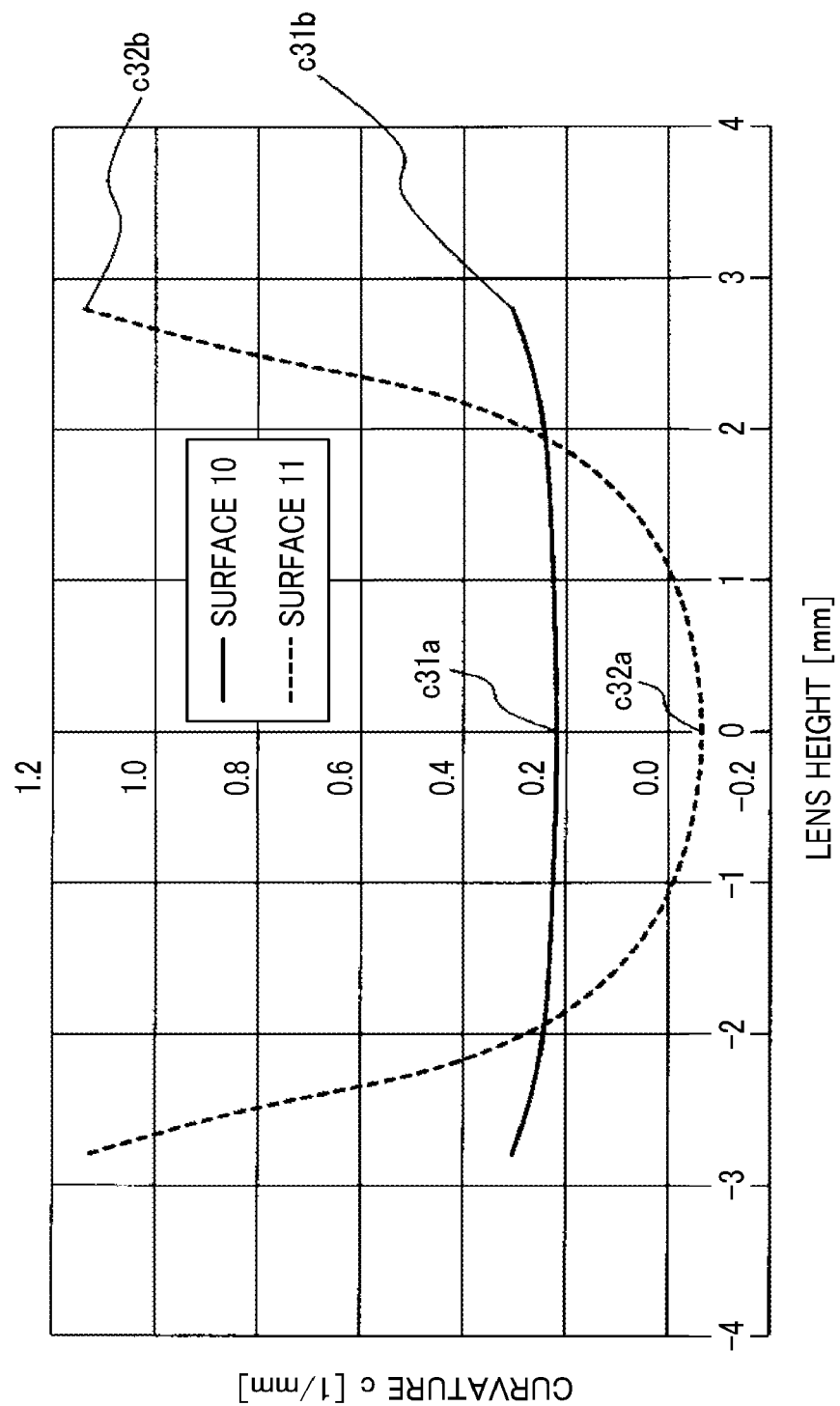
FIG. 16 is a graph presenting a transition of curvature from an on-axis position to an off-axis position of each of an object-side surface and an image-side surface of a plastic lens located closest to an image side of a second lens group in the imaging optical system according to Numerical Example 3.
Figure 17:
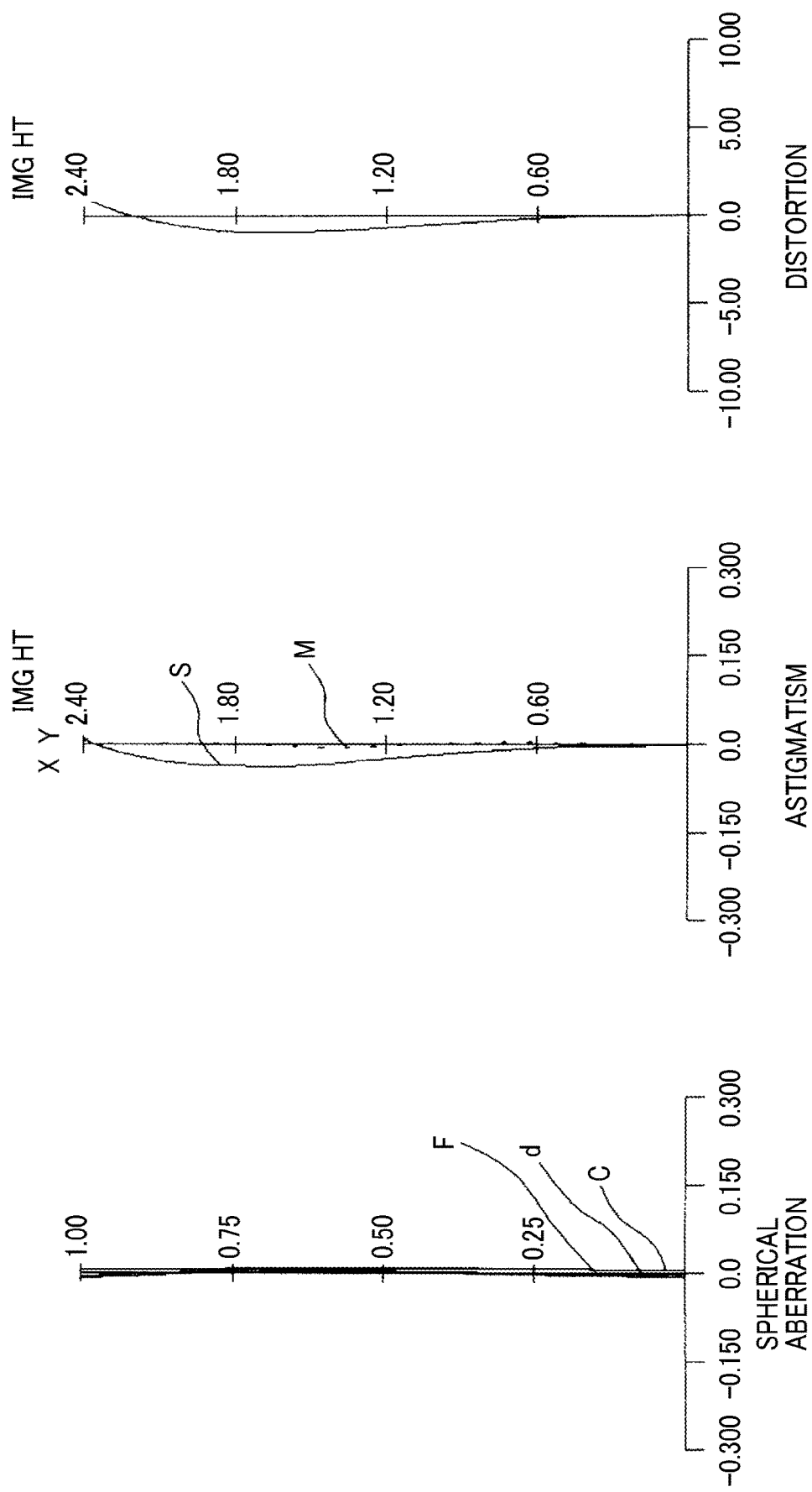
FIG. 17 provides graphs presenting spherical aberration, astigmatism, and distortion of the imaging optical system according to Numerical Example 3.
Figure 18:
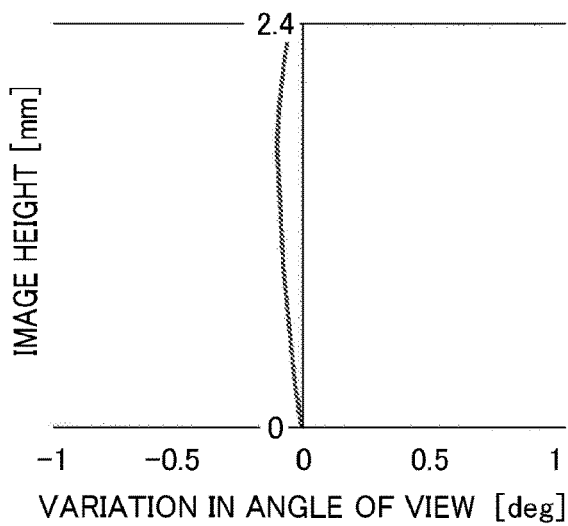
FIG. 18 illustrates a variation in angle of view at a temperature change of a ray that reaches each image height of the imaging optical system according to Numerical Example 3.

FIG. 13 is a cross-sectional view illustrating a lens configuration of an imaging optical system 50 according to Numerical Example 3. FIG. 14 is a table presenting data of respective optical surfaces of the imaging optical system 50 according to Numerical Example 3. FIG. 15 is a table presenting aspherical data of aspherical lenses of the imaging optical system 50 according to Numerical Example 3. FIG. 16 is a graph presenting a transition of curvature from an on-axis position to an off-axis position of each of an object-side surface and an image-side surface of a plastic lens located closest to an image side of a second lens group in the imaging optical system 50 according to Numerical Example 3 (c31b and c32b are values of lens effective diameters corresponding to an outermost end of 2.8 mm). FIG. 17 provides graphs presenting spherical aberration, astigmatism, and distortion of the imaging optical system 50 according to Numerical Example 3. FIG. 18 illustrates a variation in angle of view at a temperature change of a ray that reaches each image height of the imaging optical system 50 according to Numerical Example 3.

As illustrated in FIG. 13, the imaging optical system 50 of Numerical Example 3 includes, sequentially from an object side toward an image side, a first lens group G1 having a positive refractive power, an aperture stop S, and a second lens group G2 having a positive refractive power. Reference sign IMG denotes an image surface in terms of design. First and second optical filters F1 and F2 are provided between the second lens group G2 and the image surface IMG.

The first lens group G1 includes, sequentially from the object side toward the image side, a lens L1 and a lens L2. The second lens group G2 includes, sequentially from the object side toward the image side, a lens L3, a lens L4, and a lens L5.

The lens L1 has a meniscus shape having a negative power and having a convex surface facing the object side. The lens L2 has a meniscus shape having a positive power and having a concave surface facing the object side. The lens L3 has a biconcave shape having a negative power. The lens L4 has a biconvex shape having a positive power. The lens L5 has a biconvex shape having a positive power at an on-axis position thereof, and also having a meniscus shape having a negative power at an off-axis position thereof and having a concave surface facing the object side (the lens L5 has a point of inflection in a way from the on-axis position to the off-axis position). The lens L1 uses a glass lens, the lens L2 uses a plastic lens, the lens L3 uses a plastic lens, the lens L4 uses a glass lens, and the lens L5 uses a plastic lens.

In Numerical Example 3, whole-system focal length f=4.29 (mm), full-aperture F-number Fno=1.90, half angle of view θ=29.2 (deg), and maximum image height Y=2.4 (mm) are established.

Figure 19:
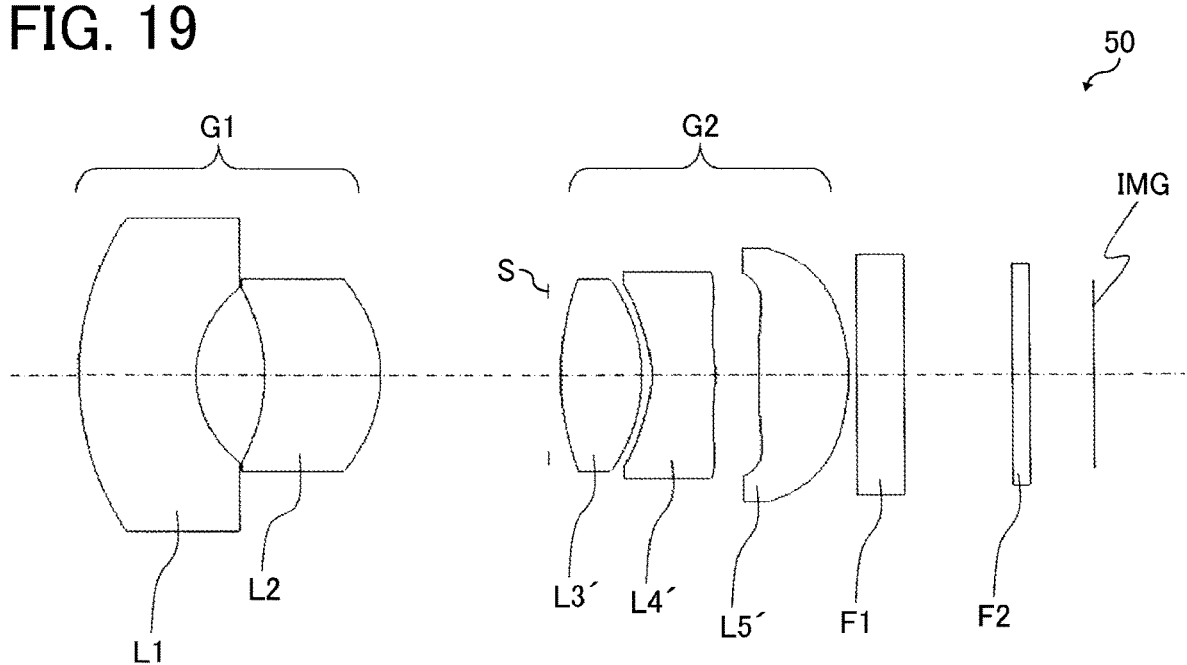
FIG. 19 is a cross-sectional view illustrating a lens configuration of an imaging optical system according to Numerical Example 4.
Figure 22:
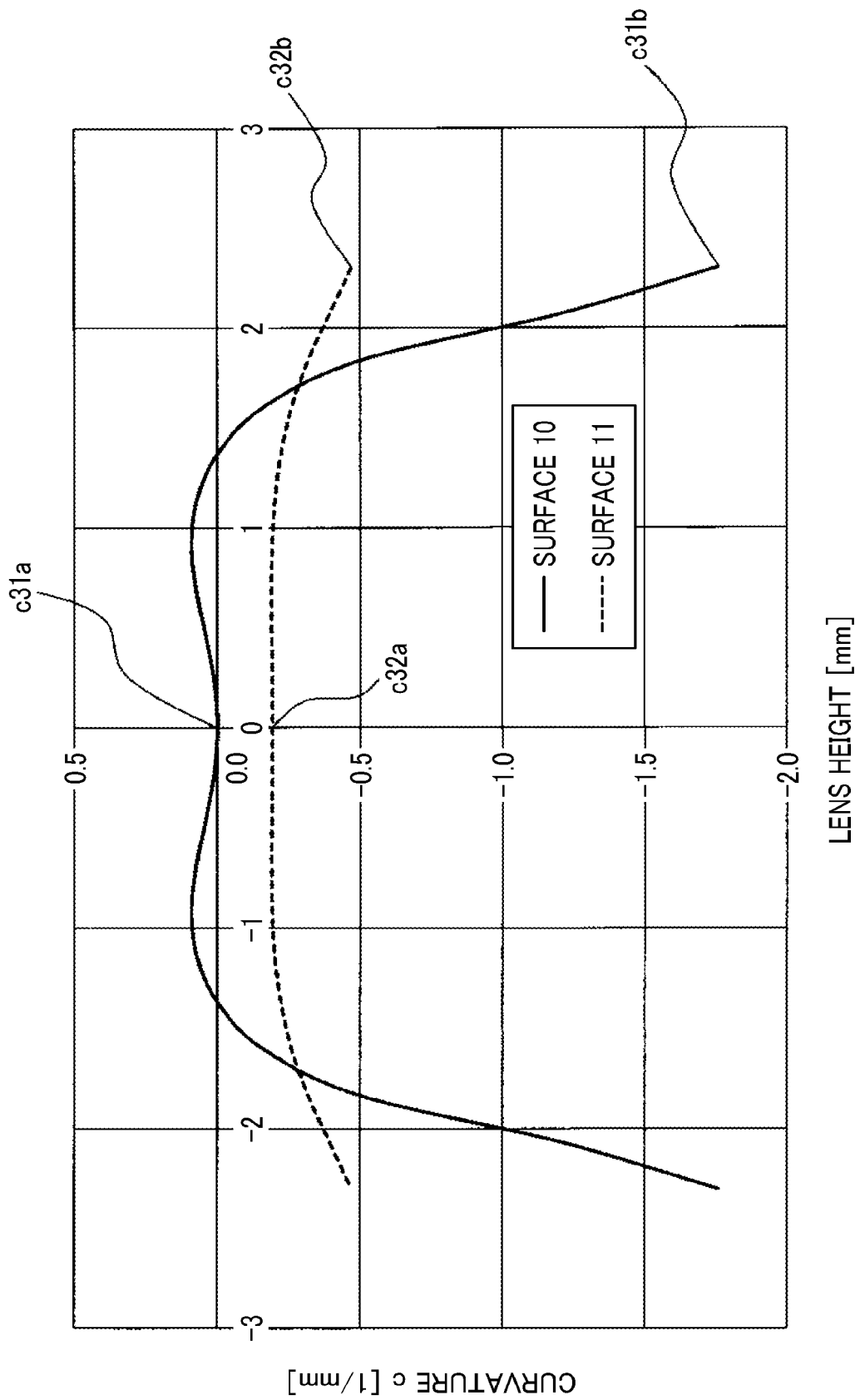
FIG. 22 is a graph presenting a transition of curvature from an on-axis position to an off-axis position of each of an object-side surface and an image-side surface of a plastic lens located closest to an image side of a second lens group in the imaging optical system according to Numerical Example 4.
Figure 23:
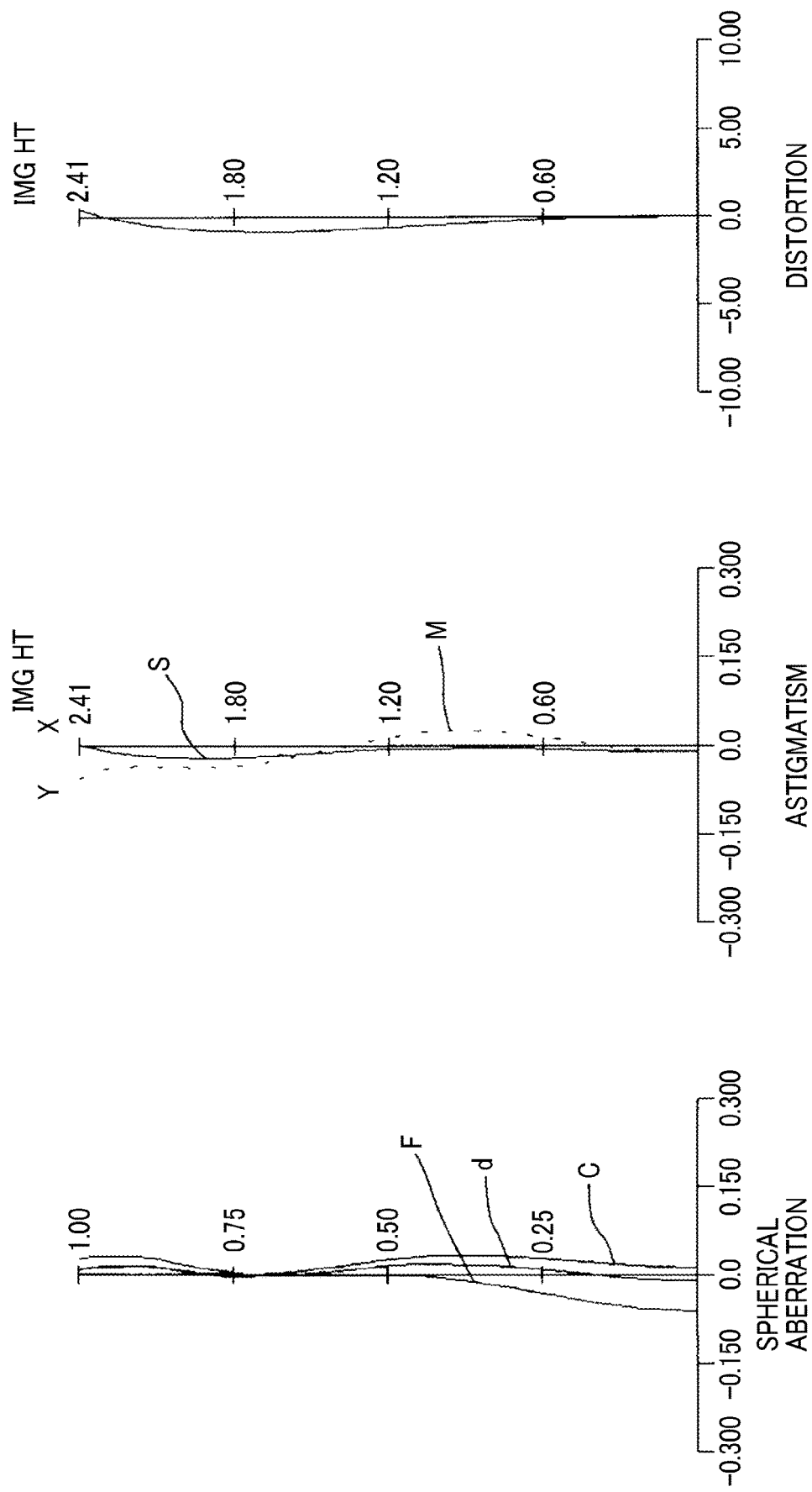
FIG. 23 provides graphs presenting spherical aberration, astigmatism, and distortion of the imaging optical system according to Numerical Example 4.
Figure 24:
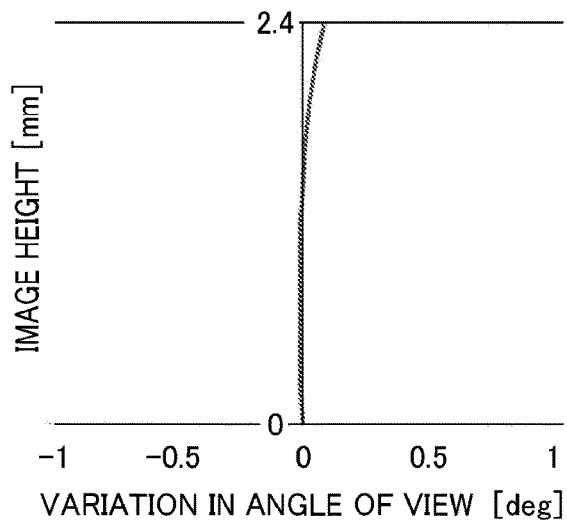
FIG. 24 illustrates a variation in angle of view at a temperature change of a ray that reaches each image height of the imaging optical system according to Numerical Example 4.

FIG. 19 is a cross-sectional view illustrating a lens configuration of an imaging optical system 50 according to Numerical Example 4. FIG. 20 is a table presenting data of respective optical surfaces of the imaging optical system 50 according to Numerical Example 4. FIG. 21 is a table presenting aspherical data of aspherical lenses of the imaging optical system 50 according to Numerical Example 4. FIG. 22 is a graph presenting a transition of curvature from an on-axis position to an off-axis position of each of an object-side surface and an image-side surface of a plastic lens located closest to an image side of a second lens group in the imaging optical system 50 according to Numerical Example 4 (c31b and c32b are values of lens effective diameters corresponding to an outermost end of 2.3 mm). FIG. 23 provides graphs presenting spherical aberration, astigmatism, and distortion of the imaging optical system 50 according to Numerical Example 4. FIG. 24 illustrates a variation in angle of view at a temperature change of a ray that reaches each image height of the imaging optical system 50 according to Numerical Example 4.

As illustrated in FIG. 19, the imaging optical system 50 of Numerical Example 4 includes, sequentially from an object side toward an image side, a first lens group G1 having a negative refractive power, an aperture stop S, and a second lens group G2 having a positive refractive power. Reference sign IMG denotes an image surface in terms of design. First and second optical filters F1 and F2 are provided between the second lens group G2 and the image surface IMG.

The first lens group G1 includes, sequentially from the object side toward the image side, a lens L1 and a lens L2. The second lens group G2 includes, sequentially from the object side toward the image side, a lens L3', a lens L4', and a lens L5'.

The lens L1 has a meniscus shape having a negative power and having a convex surface facing the object side. The lens L2 has a meniscus shape having a positive power and having a concave surface facing the object side. The lens L3' has a biconvex shape having a positive power. The lens L4' has a meniscus shape having a negative power and having a concave surface facing the object side. The lens L5' has a biconvex shape having a positive power at an on-axis position thereof, and also having a meniscus shape having a negative power at an off-axis position thereof and having a concave surface facing the object side (the lens L5' has a point of inflection in a way from the on-axis position to the off-axis position). The lens L1 uses a glass lens, the lens L2 uses a plastic lens, the lens L3' uses a glass lens, the lens L4' uses a plastic lens, and the lens L5' uses a plastic lens.

In Numerical Example 4, whole-system focal length f=4.29 (mm), full-aperture F-number Fno=1.90, half angle of view θ=29.2 (deg), and maximum image height Y=2.4 (mm) are established.

An imaging optical system 50 according to an embodiment includes, sequentially from an object side toward an image side, a first lens group G1 having one of a positive refractive power and a negative refractive power, an aperture stop S, and a second lens group G2 having a positive refractive power. The first lens group G1 includes, sequentially from the object side toward the image side, a negative lens L1 having a meniscus shape, and a positive lens L2 having a meniscus shape and formed of a plastic lens. The second lens group G2 includes, sequentially from the object side toward the image side, a negative lens L3, a positive lens L4, and a positive lens L5. Alternatively, the second lens group G2 includes, sequentially from the object side toward the image side, a positive lens L3', a negative lens L4', and a positive lens L5'. In the second lens group G2, the negative lens L3 and the negative lens L4', and the positive lens L5 and the positive lens L5' closest to the image side use plastic lenses.

The imaging optical system 50 according to the present embodiment can be used for, for example, a camera apparatus for sensing, such as a monitoring camera or an on-vehicle camera. The purpose of use of the imaging optical system 50 according to the present embodiment is not limited to sensing. The imaging optical system 50 may be used as, for example, an imaging optical system for a digital camera used for taking a still-image or a movie, or an imaging optical system for a film camera using a silver-salt film.

Demands for camera apparatuses increase. In particular, the demands include an increase in image quality, a reduction in size, an increase in angle of view, an increase in diameter of aperture, and a reduction in cost. It is requested to develop camera apparatuses that satisfy the demands. For precise measurement devices such as stereo cameras, a demand of low distortion also increases to reduce an influence on a measurement error or to reduce a burden of electronic image correction. Optical design that satisfies the demands is requested. In addition, functional stability in a severe use environment is also requested. In particular, for an on-vehicle stereo camera, it is requested to decrease a variation in angle of view or a variation in image height when a temperature environment changes in view of optical design. In this case, a variation in angle of view represents a phenomenon in which the angle of view of a ray that reaches the same image height on a sensor varies before and after a temperature change. A variation in image height represents a phenomenon in which the image height on the sensor of a ray that reaches the sensor at the same angle of view varies before and after a temperature change. The phenomena are substantially equivalent to each other.

In general, when the angle of view is increased, in particular, distortion is likely increased in addition to coma aberration, astigmatism, and field curvature. When the diameter of aperture is increased, in particular, spherical aberration is likely increased in addition to coma aberration. Taking a measure for an optical system to correct aberrations tends to increase the size and cost of the optical system.

For example, there are a demand to a certain extent for a relatively wide-view-angle, large-aperture-diameter compact imaging optical system with high image quality in which, in particular, distortion is suppressed to constitute a compact, high-performance stereo camera. Distortion is one of major factors of deteriorating the accuracy of distance measurement performed by a stereo camera. It is desirable to optically or electronically correct distortion. For example, the maximum permissible amount of distortion is desirably less than about ±1%. However, electronically correcting distortion affects the circuit capacity or calculation performance of an electronic circuit board of the camera, leading to increases in size and cost of the camera. Moreover, it is requested to further accurately acquire identification information, such as the size and shape of an object which is a sensing target. Hence, even when a lens has an angle of view which is wide to a certain extent, it is desirable to optically properly correct distortion. Furthermore, there are also demands for that a sensing camera apparatus has high resolution to allow identification of a relatively small object or observation of a relatively far situation, has a large diameter of aperture to allow proper imaging and recognition even in a dark environment such as during night, is compact to increase the degree of freedom in installation, and provides temperature compensation for stably exhibiting performance under various environmental conditions.

The imaging optical system 50 according to the present embodiment employs the following basic configuration, thereby attaining an increase in angle of view and an increase in diameter of aperture while suppressing aberrations. The first lens group G1 disposed closer than the aperture stop S to the object side includes the first lens L1 and the second lens L2. The first lens L1 has the meniscus shape having the negative power. The second lens L2 has the meniscus shape having the positive power. Since the first lens L1 has the negative power to increase the angle of view and has the meniscus shape, off-axis aberrations, or in particular, astigmatism, which are likely generated when the negative power is increased to take in rays the wide angle of view. Since the second lens L2 has the positive power to balance distortion in the first lens group G1 and has the meniscus shape, a function of correcting spherical aberration which is generated as a result of an increase in diameter of aperture is provided. The meniscus shape of the second lens L2 desirably has the concave surface facing the object side. Thus, the Petzval sum can be decreased and field curvature can be suppressed to a small value. The second lens group G2 disposed closer than the aperture stop S to the image side corrects aberrations which are not completely corrected by the first lens group G1. Thus, proper imaging performance can be secured with low distortion while the angle of view and the diameter of aperture are relatively large.

In this case, the above-described configuration or a portion of the configuration employs a plastic lens. Plastic lenses are typically advantageous compared to glass lenses in view of low cost and light weight. However, plastic lenses may not have stable characteristics in a wide temperature range. Plastic lenses have relatively larger coefficients of linear expansion and temperature coefficients of refractive indices than those of glass lenses, and hence the plastic lenses have large changes in RDN in an environment with a temperature change, and performance thereof is likely deteriorated. In particular, for a camera for sensing, when the angle of view largely varies due to a change in RDN, measurement accuracy may be deteriorated.

In light of the situations, according to the present embodiment, in addition to the above-described configuration, the positive lens L2 of the first lens group G1 and the positive lens L5 or L5' of the second lens group G2 use the plastic lenses to attain reductions in cost and weight, and the positive lens L2 of the first lens group G1 has the meniscus shape having the positive power. Furthermore, the plastic lens L5 or L5' of the second lens group G2 is set to have a shape that satisfies Conditional Expressions (1) and (2) as follows:

$$c31a > c32a, \text{ and} \qquad (1)$$

$$c31b < c32b, \qquad (2)$$

where
$c31a$ is an on-axis curvature of an object-side surface of the plastic lens L5 or L5' of the second lens group G2, c32a is an on-axis curvature of an image-side surface of the plastic lens L5 or L5' of the second lens group G2, c31b is an off-axis curvature of the object-side surface of the plastic lens L5 or L5' of the second lens group G2, and c32b is an off-axis curvature of the image-side surface of the plastic lens L5 or L5' of the second lens group G2.

"An on-axis curvature" represents, for example, a local curvature at a position close to an optical axis. "An off-axis curvature" represents a local curvature at a lens height of smaller one of an effective diameter at an outermost end of an object-side surface and an effective diameter at an outermost end of an image-side surface (c31b and c32b are calculated at the same lens height).

The respective values of c31a, c32a, c31b, and c32b according to Numerical Examples 1 to 4 described above can be visually recognized using curvature transition diagrams in FIGS. 4, 10, 16, and 22.

Conditional Expressions (1) and (2) are satisfied to properly correct a variation in angle of view (a variation in image height) when a temperature environment changes to obtain excellent optical performance. Unless at least one of Conditional Expressions (1) and (2) is satisfied, a variation in angle of view (a variation in image height) when a temperature environment changes is not sufficiently corrected, and sufficient optical performance is no longer obtained.

Regarding an aspherical shape, when a displacement X in the optical-axis direction is expressed by the following Equation (A), it is generally known that a local curvature at a certain lens height is expressed by the following Equation (B).

$$X = \frac{(H^2/R)}{1+\sqrt{1-(1+k)(H/R)^2}} + \sum A_i \cdot H^i \quad (A)$$

$$C = \frac{X''}{(1+X'^2)^{3/2}} \quad (B)$$

In the equations, H is a lens height from the optical axis with respect to a surface vertex, R is a curvature radius at the surface vertex, k is a conical constant, Ai is an aspherical coefficient with respect to an order i, X' is an amount obtained by differentiating the displacement X in the optical-axis direction with respect to the lens height H by first-order derivation, and X" is an amount obtained by differentiating the displacement X in the optical-axis direction with respect to the lens height H by second-order derivation. At any surface on the object side and the image side, c is positive in the case of a convex surface shape facing the object side and c is negative in the case of a concave surface shape facing the object side. In other words, when c of the object-side surface is positive, the object-side surface has a positive power. When c of the image-side surface is positive, the image-side surface has a negative power. Thus, when Conditional Expression (1) is satisfied, the plastic lens L5 or L5' of the second lens group G2 has a positive power at an on-axis portion. When Conditional Expression (2) is satisfied, the plastic lens L5 or L5' of the second lens group G2 has a negative power at an off-axis portion.

As described above, since plastic lenses have relatively larger coefficients of linear expansion and temperature coefficients of refractive indices than those of glass lenses, for example, in a high temperature environment, the curvature and refractive index of a plastic lens markedly decrease, and either of positive and negative powers is weakened.

Focusing on the on-axis power according to the present embodiment, the positive powers of the positive lens L2 of the first lens group G1 and the positive lens L5 or L5' of the second lens group G2, which are plastic lenses, are weakened. This increases the focal length of the whole system. In contrast, focusing on the off-axis power, since the off-axis positive power of the positive lens L2 of the first lens group G1 disposed closer than the aperture stop S to the object side is weakened, distortion shifts to the minus side and field curvature shifts to the plus side. Since the off-axis negative power of the positive lens L5 or L5' of the second lens group G2 disposed closer than the aperture stop S to the image side is weakened, distortion shifts to the minus side and field curvature shifts to the minus side.

The plus side of distortion indicates a direction in which an image shape is of a pincushion, and the minus side indicates a direction in which an image shape is of a barrel. The plus side of field curvature indicates that a curve appears in a direction in which an off-axis image forming position is separated from the object side, and the minus side indicates that a curve appears in a direction in which an off-axis image forming position approaches the object side. Thus, in the imaging optical system 50 according to the present embodiment, in a high temperature environment, the focal length of the whole system increases, distortion is further shifted to the minus side by the changes of the positive lens L2 of the first lens group G1 and the positive lens L5 or L5' of the second lens group G2, and field curvature can be cancelled by the changes of the positive lens L2 of the first lens group G1 and the positive lens L5 or L5' of the second lens group G2.

Figure 25:
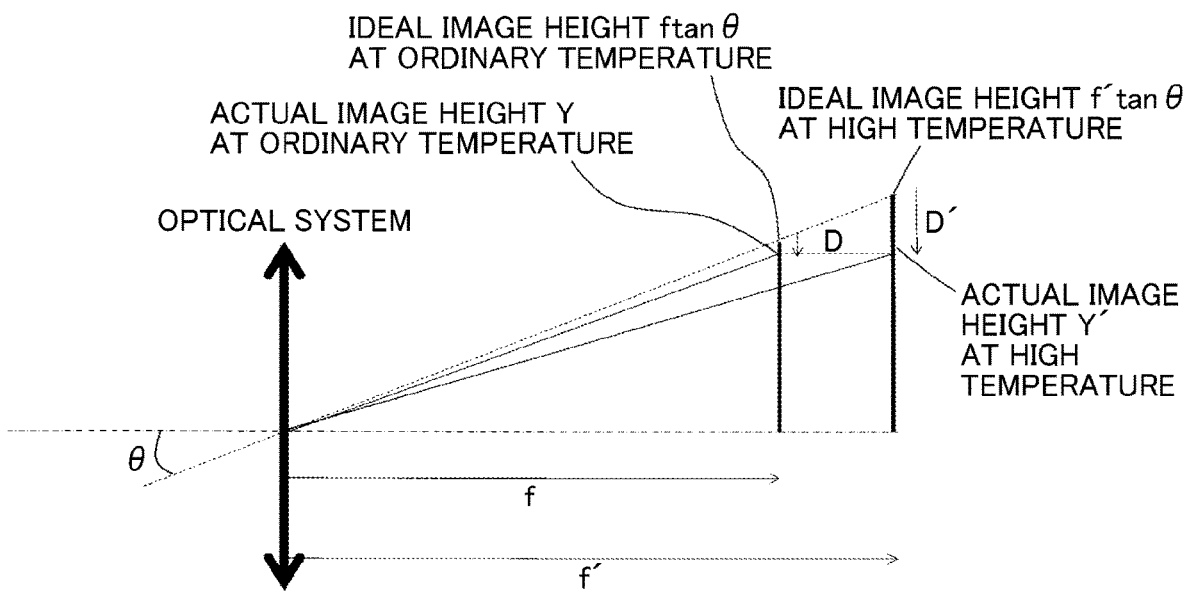
FIG. 25 is a graph presenting image forming states in an ordinary temperature environment and a high temperature environment in a comparable manner.

FIG. 25 is a graph presenting image forming states in an ordinary temperature environment and a high temperature environment in a comparable manner. Referring to FIG. 25, θ denotes an angle of view at which a ray is incident on the imaging optical system 50, f denotes a focal length in an ordinary temperature environment, f' denotes a focal length in a high temperature environment, D denotes a distortion in the ordinary temperature environment, D' denotes a distortion in the high temperature environment, Y denotes an actual image height in the ordinary temperature environment, Y' denotes an actual image height in the high temperature environment, f tan θ denotes an ideal image height in the ordinary temperature environment, and f' tan θ denotes an ideal image height in the high temperature environment. The distortion D in the ordinary temperature environment is expressed by the following Equation (C) using the ideal image height f tan θ and the actual image height Y in the ordinary temperature environment.

$$D = \frac{Y - f \tan \theta}{f \tan \theta} \quad (C)$$

In the imaging optical system 50 according to the present embodiment, in the high temperature environment, a bundle of light incident at an angle of view θ forms an image at a focal length f' at a high temperature that is longer than a focal length f at an ordinary temperature. At this time, intentionally worsening a distortion D' to the minus side as compared to D at an ordinary temperature can suppress a change in actual image height between at an ordinary temperature and at a high temperature, that is, a variation in image height (as described above, a variation in angle of view and a variation in image height are phenomena substantially equivalent to each other). In the low temperature environment, the directivity is opposite to that in the high temperature environment. The focal length of the whole system decreases and the distortion shifts to the plus side. Thus, a like advantageous effect can be obtained by a like configuration.

According to a typical way of thinking for design, in order to compensate a variation in angle of view due to a temperature change, a variation in focal length is suppressed. However, to allow a system having a positive focal length as a whole system to suppress a variation in focal length at a temperature change, a large degree of freedom in design is required, which is very difficult to be attained. In the present embodiment, focusing on that a variation in angle of view is suppressed by controlling distortion even when the focal length varies, there is successfully attained an optical configuration that can suppress a variation in angle of view while securing conditions required for securing the above-described request or imaging performance. In other words, the imaging optical system 50 according to the present embodiment is based on an alternative idea that a variation (increase) in focal length in the high temperature environment is allowed (sacrificed), and instead of this, distortion is intentionally increased to suppress a variation in angle of view (a variation in image height).

In this way, the imaging optical system 50 according to the present embodiment can secure proper imaging performance with low distortion while having a wide angle of view and a large diameter of aperture. Moreover, by taking a measure for the configurations of the plastic positive lens L2 of the first lens group G1 and the plastic positive lens L5 or L5' of the second lens group G2, a variation in angle of view (a variation in image height) can be suppressed while a variation in field curvature due to a temperature change is cancelled.

The imaging optical system 50 according to the present embodiment satisfies Conditional Expressions (3) and (4) as follows:

$$\alpha 2 > 30 \times 10^{-6}, \text{ and} \tag{3}$$

$$\alpha 3 > 30 \times 10^{-6}, \tag{4}$$

where
$\alpha 2$ is a coefficient of linear expansion of the positive lens L2 of the first lens group G1, and
$\alpha 3$ is a coefficient of linear expansion of the plastic lens L5 or L5' of the second lens group G2.

The imaging optical system 50 according to the present embodiment satisfies Conditional Expressions (5) and (6) as follows:

$$\beta 2 < -50 \times 10^{-6}, \text{ and} \tag{5}$$

$$\beta 3 < -50 \times 10^{-6}, \tag{6}$$

where
$\beta 2$ is a temperature coefficient of a refractive index of the positive lens L2 of the first lens group G1, and
$\beta 3$ is a temperature coefficient of a refractive index of the plastic lens L5 or L5' of the second lens group G2.

"A temperature coefficient of a refractive index" represents, for example, a value of a temperature coefficient of a relative refractive index in an ambient air in a range of from 20° C. to 40° C. for the d-line.

By setting the coefficients of linear expansion and the temperature coefficients of the refractive indices of the positive lens L2 of the first lens group G1 and the plastic lens L5 or L5' of the second lens group G2 to satisfy Conditional Expressions (3), (4), (5), and (6), a variation in angle of view (a variation in image height) can be further suppressed while a variation in field curvature due to a temperature change is cancelled. As far as Conditional Expressions (3), (4), (5), and (6) are satisfied, a material (glass member) other than a plastic lens may be used for the positive lens L2 and the positive lens L5 or L5'.

The imaging optical system 50 according to the present embodiment satisfies Conditional Expression (7) as follows:

$$0.2 < \varphi 2a/\varphi 3a < 0.8, \tag{7}$$

where
$\varphi 2a$ is an on-axis power of the positive lens L2 of the first lens group G1, and
$\varphi 3a$ is an on-axis power of the plastic lens L5 or L5' of the second lens group G2.

Conditional Expression (7) determines a range of a power distribution that allows variations in field curvature, distortion, and focal length due to a temperature change to be cancelled between the positive lens L2 of the first lens group G1 and the plastic lens L5 or L5' of the second lens group G2. Satisfying Conditional Expression (7) can suppress variations in field curvature, distortion, and focal length in a well balanced manner. If the value is below the lower limit of Conditional Expression (7), because of large on-axis positive power and off-axis negative power of the plastic lens L5 or L5' of the second lens group G2, variations in field curvature, distortion, and focal length due to a temperature change of the plastic lens L5 or L5' of the second lens group G2 become relatively large and are no longer cancelled by variations in field curvature, distortion, and focal length due to a temperature change of the positive lens L2 of the first lens group G1. If the value is above the upper limit of Conditional Expression (7), variations in field curvature, distortion, and focal length due to a temperature change of the plastic lens L5 or L5' of the second lens group G2 are relatively small, and variations in field curvature, distortion, and focal length due to a temperature change of the positive lens L2 of the first lens group G1 become excessive.

The imaging optical system 50 according to the present embodiment satisfies Conditional Expression (8) as follows:

$$\varphi 2a + \varphi 3a < \varphi A, \tag{8}$$

where
$\varphi 2a$ is an on-axis power of the positive lens L2 of the first lens group G1,
$\varphi 3a$ is an on-axis power of the plastic lens L5 or L5' of the second lens group G2, and
$\varphi A$ is an on-axis power of a whole system of the optical system.

Satisfying Conditional Expression (8) can distribute a positive power required for forming an image of object light on the image surface to another lens that is not the positive lens L2 of the first lens group G1 or the plastic lens L5 or L5' of the second lens group G2. The power for an image forming function of the whole system is minimally given to the positive lens L2 of the first lens group G1 and the plastic lens L5 or L5' of the second lens group G2. Thus, the power distribution ($\varphi 2a/\varphi 3a$) between the positive lens L2 of the first lens group G1 and the plastic lens L5 or L5' of the second lens group G2 can be freely set. In addition, when a plastic lens has an aspherical surface, in particular, the plastic lens L5 or L5' of the second lens group G2 tends to be more deteriorated in imaging performance with respect to a tolerance of eccentricity because the plastic lens L5 or L5' has a shape having an on-axis positive power and an off-axis negative power to attain an advantageous effect of the present embodiment. The deterioration in imaging performance can be suppressed by decreasing the powers of the aspherical surfaces.

The imaging optical system 50 according to the present embodiment satisfies Conditional Expression (9) as follows:

$$|c31a-c32a|<|c31b-c32b|. \quad (9)$$

Satisfying Conditional Expression (9) can make the on-axis power be relatively smaller than the off-axis power of the plastic lens L5 or L5' of the second lens group G2. An excessive increase in focal length with respect to a variation in distortion due to a temperature change of the plastic lens L5 or L5' of the second lens group G2 is suppressed. The relationship between a variation in distortion and a variation in focal length, which can suppress a variation in angle of view, can be easily maintained.

The plastic lens L5 or L5' of the second lens group G2 is disposed closest to the image side of the second lens group G2. Accordingly, a ray that is separated from the aperture stop S and reaches each image height can be separated on a lens surface of the plastic lens L5 or L5' of the second lens group G2. Thus, it is easier to give a positive power to an on-axis ray and to give a negative power to an off-axis ray. Off-axis aberrations, such as field curvature and distortion, which are significant parameters according to the present embodiment, can be easily controlled to desirable values.

The second lens group G2 includes the negative lens L3 or L4' formed of a plastic lens, in addition to the plastic lens L5 or L5' disposed closest to the image side of the second lens group G2. When a change in imaging performance is suppressed for sharpness of an image, it is effective to increase the focal length of the entire optical system in a high temperature environment so as to follow a light receiving element that moves in a positive direction due to thermal expansion of a holding member of the optical system. However, a variation in angle of view is a serious error that causes a decrease in accuracy of distance measurement in a stereo camera apparatus. In the present embodiment, for temperature compensation, a variation in angle of view that changes the position of an image is suppressed with higher priority than a variation in focal position that decreases sharpness of an image. Specifically, when the power distribution ($\varphi 2a/\varphi 3a$) between the positive lens L2 of the first lens group G1 and the plastic lens L5 or L5' of the second lens group G2 is set to cancel field curvature like the present embodiment to cause an increase in focal length and a shift to the minus side of distortion to suppress a variation in image height, the resultant configuration may not correspond to a movement of the light receiving element and the focal position may be deviated from the light receiving element at a change in environment. In particular, the powers in the same direction of the on-axis positive power of the positive lens L2 of the first lens group G1 and the on-axis positive power of the plastic lens L5 or L5' of the second lens group G2 are weakened in a high temperature environment. The focal length may be excessively increased. Thus, to suppress a variation in angle of view and then to suppress a variation in focal position, the negative lens L3 or L4' which is another plastic lens is disposed in the second lens group G2 according to the present embodiment. Since a negative power is disposed in the second lens group G2 disposed closer than the aperture stop S to the image side, a component of shifting distortion to the minus side and suppressing an increase in focal length is added, thereby decreasing both a variation in angle of view and a variation in focal position.

The positive lens L2 of the first lens group G1 has a concave surface facing the object side. Accordingly, the Petzval sum is decreased and field curvature can be suppressed to a small value.

The negative lens L1 of the first lens group G1 is formed of a glass lens. For example, an on-vehicle camera apparatus needs to assure high performance even in severe environments, and hence a first lens (the negative lens L1) that is disposed closest to the object side of the camera apparatus and is likely affected by a use environment desirably use a glass lens formed of glass. Since the first lens (the negative lens L1) is the glass lens, an imaging lens that is weather resistant and hardly broken can be provided. Moreover, since the first lens (the negative lens L1) is a lens with a negative power disposed closer than the aperture stop S to the object side, for example, distortion is shifted to the plus side in a high temperature environment and the focal length is decreased. To avoid interruption of variations in distortion and focal length due to a temperature change according to the present embodiment described with reference to FIG. 25, the first lens (the negative lens L1) is preferably formed of a glass lens.

Table 1 presents values corresponding to Conditional Expression (1) to Conditional Expression (9) of the above-described Numerical Examples 1 to 4. As it is found from Table 1, Numerical Examples 1 to 4 satisfy Conditional Expression (1) to Conditional Expression (9) according to the present embodiment.

TABLE 1

|  | Numerical Example 1 | Numerical Example 2 |
|---|---|---|
| Conditional Expressions (1), (2), and (9) |  |  |
| c31a | 0.037 | 0.020 |
| c32a | −0.175 | −0.215 |
| c31b | −1.042 | 1.118 |
| c32b | −0.331 | −0.394 |
| Conditional Expression (3) |  |  |
| α2 | 70 × 10$^{-6}$ | 70 × 10$^{-6}$ |
| Conditional Expression (4) |  |  |
| α3 | 59 × 10$^{-6}$ | 59 × 10$^{-6}$ |
| Conditional Expression (5) |  |  |
| β2 | −104 × 10$^{-6}$ | −104 × 10$^{-6}$ |
| Conditional Expression (6) |  |  |
| β3 | −95 × 10$^{-6}$ | −95 × 10$^{-6}$ |
| Conditional Expressions (7) and (8) |  |  |
| φ2a | 0.066 | 0.039 |
| φ3a | 0.111 | 0.125 |
| φA | 0.233 | 0.233 |
|  | Numerical Example 3 | Numerical Example 4 |
| Conditional Expressions (1), (2), and (9) |  |  |
| c31a | 0.219 | 0.000 |
| c32a | −0.064 | −0.193 |
| c31b | 0.305 | −1.757 |
| c32b | 1.140 | −0.469 |

TABLE 1-continued

| Conditional Expression (3) | | |
|---|---|---|
| α2 | $70 \times 10^{-6}$ | $70 \times 10^{-6}$ |
| Conditional Expression (4) | | |
| α3 | $59 \times 10^{-6}$ | $59 \times 10^{-6}$ |
| Conditional Expression (5) | | |
| β2 | $104 \times 10^{-6}$ | $-104 \times 10^{-6}$ |
| Conditional Expression (6) | | |
| β3 | $-95 \times 10^{-6}$ | $-95 \times 10^{-6}$ |
| Conditional Expressions (7) and (8) | | |
| φ2a | 0.032 | 0.082 |
| φ3a | 0.145 | 0.103 |
| φA | 0.233 | 0.233 |

As illustrated in FIGS. 5, 11, 17, and 23, in the imaging optical system 50 according to any one of Numerical Examples 1 to 4, spherical aberration, astigmatism, and distortion are sufficiently corrected. For example, the imaging optical system 50 has a compact configuration including about five lenses while having a wide angle of view such that its half angle of view is about 29 degrees and a large diameter of aperture of about F2.0 or less, and can secure very high imaging performance including a low distortion of less than about ±1%.

FIGS. 6, 12, 18, and 24 each illustrate a variation in angle of view of a ray that reaches each image height in a high temperature state in which the environmental temperature is 105° C. with respect to an ordinary temperature state at 20° C. For all image heights, the maximum variation in angle of view of Numerical Example 1 is 0.038 degrees, the maximum variation in angle of view of Numerical Example 2 is 0.054 degrees, the maximum variation in angle of view of Numerical Example 3 is 0.094 degrees, and the maximum variation in angle of view of Numerical Example 4 is 0.090 degrees. It is found that a variation in angle of view is suppressed to less than about ±0.1 degrees even in an extremely high temperature environment. A variation in angle of view when the environmental temperature becomes a low temperature state is also suppressed to less than about ±0.1 degrees similarly to the case in the high temperature state. In this case, it is presupposed to use a lens cell of aluminum having a holding structure to simply stack the lenses from the negative lens L1 toward the image surface.

A variation in on-axis focal position in the high temperature state in which the environmental temperature is 105° C. with respect to the ordinary temperature state of 20° C. is +0.002 mm (+0.05% with respect to focal length) in Numerical Example 1, −0.014 mm (−0.32% with respect to focal length) in Numerical Example 2, +0.012 mm (+0.28% with respect to focal length) in Numerical Example 3, and −0.004 mm (−0.09% with respect to focal length) in Numerical Example 4. Thus, the variation in focal position is sufficiently suppressed. That is, both a variation in angle of view and a variation in focal position can be decreased.

Figure 26A:
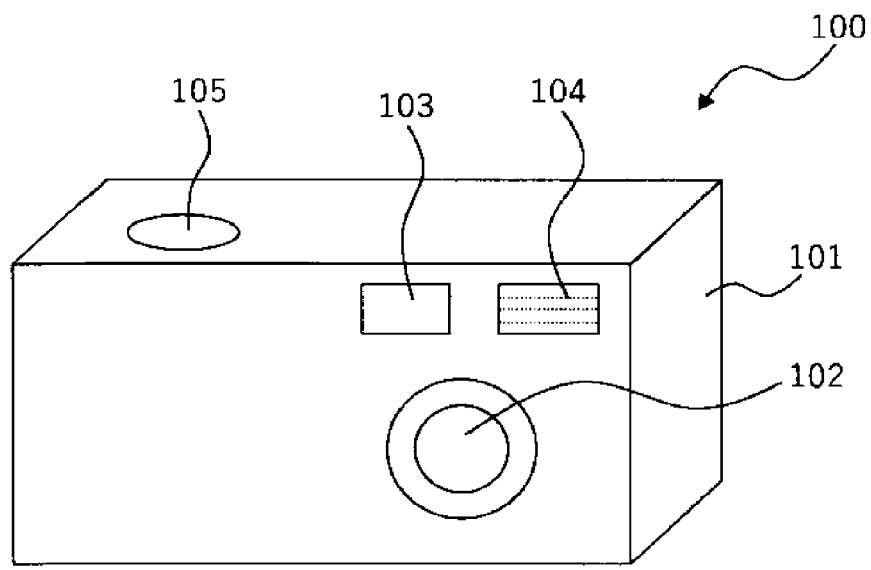
FIGS. 26A and 26B each are a first diagram illustrating a configuration of a camera apparatus incorporating an imaging optical system according to an embodiment.
Figure 26B:
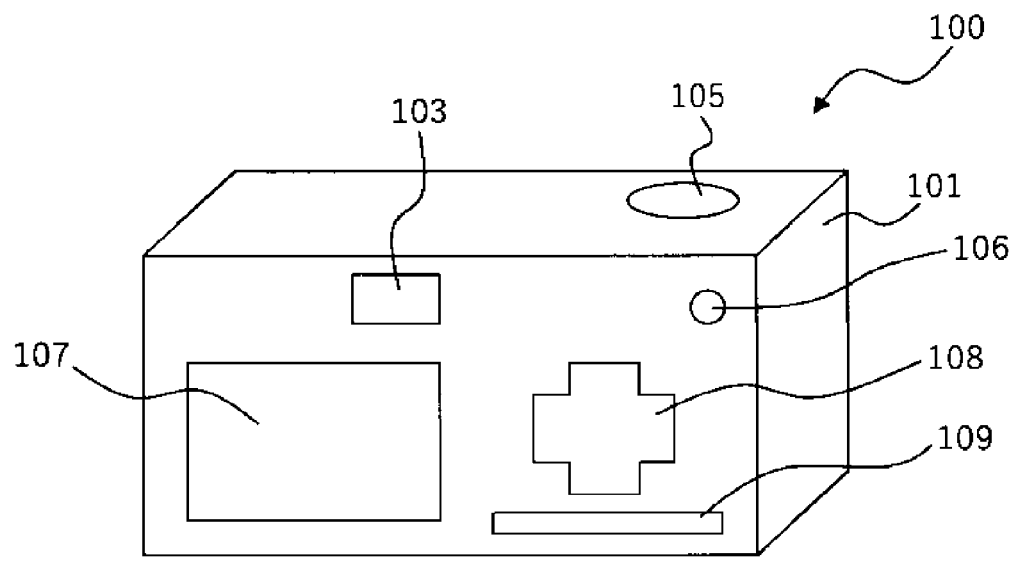
Figure 27:
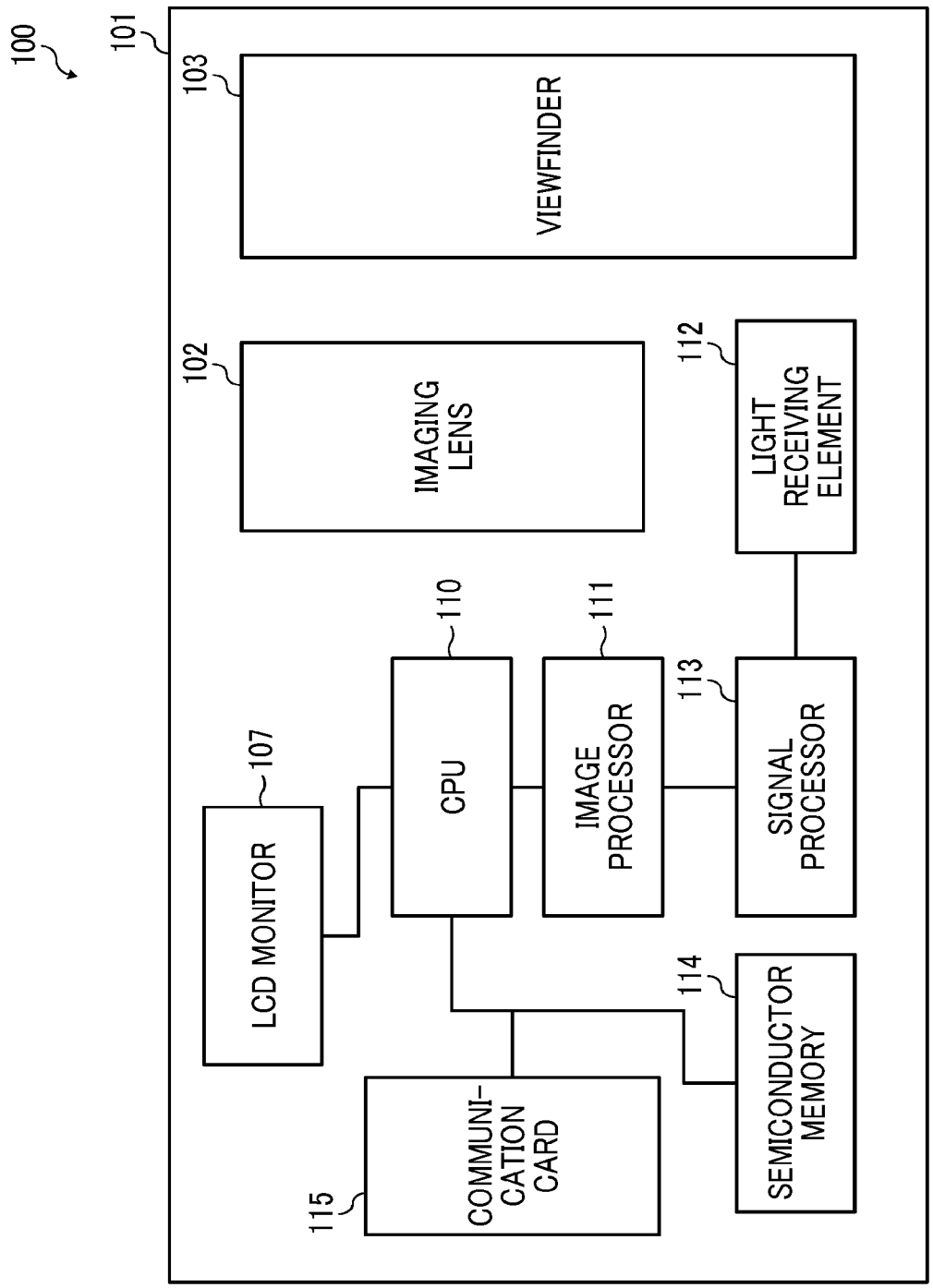
FIG. 27 is a second diagram illustrating a configuration of the camera apparatus incorporating the imaging optical system according to the present embodiment.

FIGS. 26A and 26B each are a first diagram and FIG. 27 is a second diagram illustrating a configuration of a digital camera (an imaging apparatus, a camera apparatus) 100 incorporating the imaging optical system 50 according to the present embodiment.

A camera apparatus (an imaging apparatus) is described using an example of a digital camera here; however, a silver-salt film camera using a silver-salt film as an existing image recording medium may employ the imaging optical system 50 according to the present embodiment. The imaging optical system 50 according to the present embodiment is also suitable to a camera apparatus, such as an on-vehicle camera apparatus or a monitoring camera apparatus, which is requested to have high resolution, low distortion, a wide angle of view, and a large diameter of aperture. Also, portable information terminal apparatuses, such as a so-called personal data assistant (PDA) and a mobile phone, and further various information apparatuses including mobile terminal apparatuses, such as a smart phone and a tablet terminal, including the functions of the mobile information terminal apparatuses and incorporating a camera function are widely used. Such an information apparatus includes a function and a configuration substantially similar to those of a digital camera although the appearance is different. The imaging optical system 50 according to the present embodiment may be employed as an imaging optical system 50 in such an information apparatus.

As illustrated in FIGS. 26A and 26B, a digital camera 100 includes a camera body (housing) 101, an imaging lens 102, a viewfinder 103, a flash 104, a shutter release button 105, a power button 106, a liquid crystal display (LCD) monitor 107, an operation button 108, and a memory card slot 109.

The camera body 101 houses the components of the digital camera 100. The imaging lens 102 is, for example, a unit in which the imaging optical system 50 according to the present embodiment is incorporated into a lens barrel. The viewfinder 103 is a viewing window for determining the subject and the composition. The flash 104 emits a flash when shooting at night or shooting in a dark place. The shutter release button 105 is a physical switch for performing shooting with the digital camera 100. The power button 106 is a physical switch for switching the power of the digital camera 100 on and off. The LCD monitor 107 displays, for example, an image captured by the digital camera 100. The operation button 108 is a physical switch for setting a shooting mode or the like of the digital camera 100. The memory card slot 109 is a slot into which a memory card for storing, for example, an image captured by the digital camera 100 is inserted.

As illustrated in FIG. 27, the digital camera 100 further includes a central processing unit (CPU) 110, an image processor 111, a light receiving element (image sensor) 112, a signal processor 113, a semiconductor memory 114, and a communication card 115, which are functional components within the camera body 101.

The light receiving element 112 reads a subject optical image formed by the imaging lens 102. The CPU 110 controls the signal processor 113 to convert the output of the light receiving element 112 into digital image information. Image information digitized by the signal processor 113 is processed with predetermined image processing by the image processor 111 that is controlled by the CPU 110, and then is recorded in the semiconductor memory 114 such as a non-volatile memory. In this case, the semiconductor memory 114 can use a memory card inserted in the memory card slot 109 or a semiconductor memory embedded in a camera body in an on-board manner. The LCD monitor 107 displays an image during image-capturing, or an image recorded in the semiconductor memory 114. Moreover, the image recorded in the semiconductor memory 114 can be transmitted to an external device using the communication card 115 inserted in a communication card slot, or alternatively, the memory card slot 109 can also serve as the communication card slot). When the camera is carried, the objective surface of the imaging lens 102 is covered with a lens barrier. When a user operates the power button 106 to turn on, the lens barrier is opened and the objective surface is exposed. To display an image recorded in the semiconductor memory 114 onto the LCD monitor 107 or to transmit the image to an external device using the communication card 115, the operation button 108 is operated. The semiconductor memory 114 and the communication card 115 are inserted into slots, which are respectively dedicated for or general and common to the semiconductor memory 114 and the communication card 115 and which are, for example, the memory card slot 109 and the communication card slot, and are used.

As described above, the camera apparatus or the on-vehicle camera apparatus can use the imaging lens 102 configured by using the imaging optical system 50 according to the present embodiment. Thus, the camera apparatus or the on-vehicle camera apparatus sufficiently having a wide angle of view and a large diameter of aperture, holding low distortion, and having proper performance against environments can be provided. Moreover, since a captured image is converted into digital image information and is output, the configuration can be further suitable to a sensing technology such as image analysis or image processing.

Figure 28:
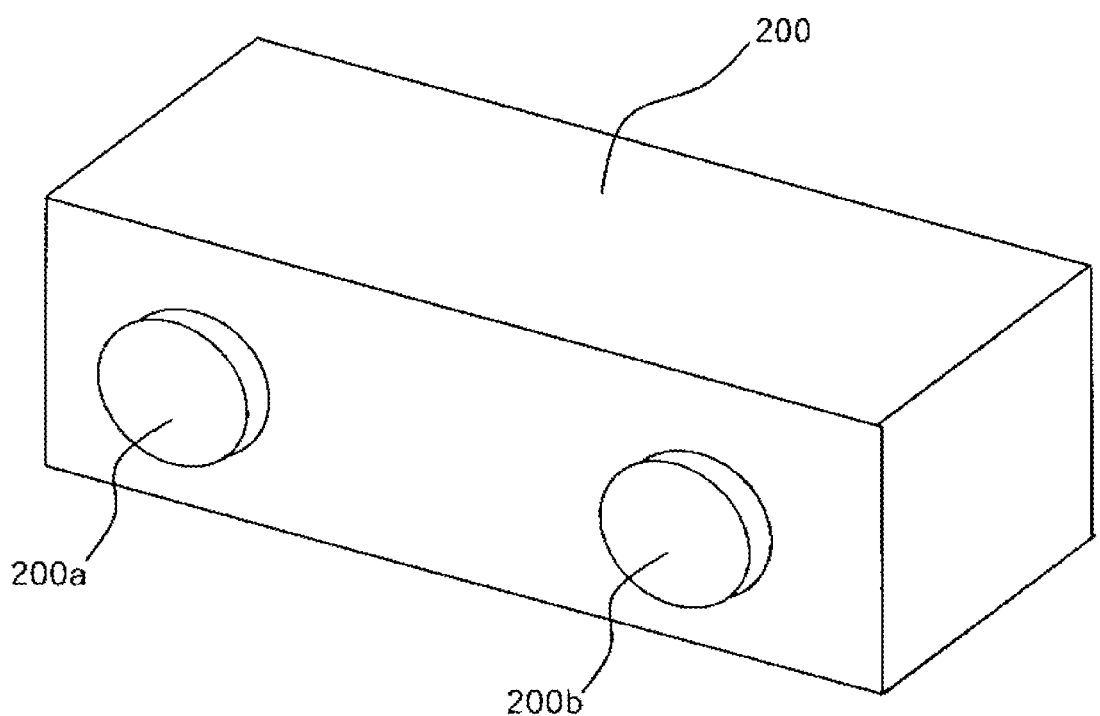
FIG. 28 illustrates a configuration of a stereo camera incorporating the imaging optical system according to the present embodiment.
Figure 29:
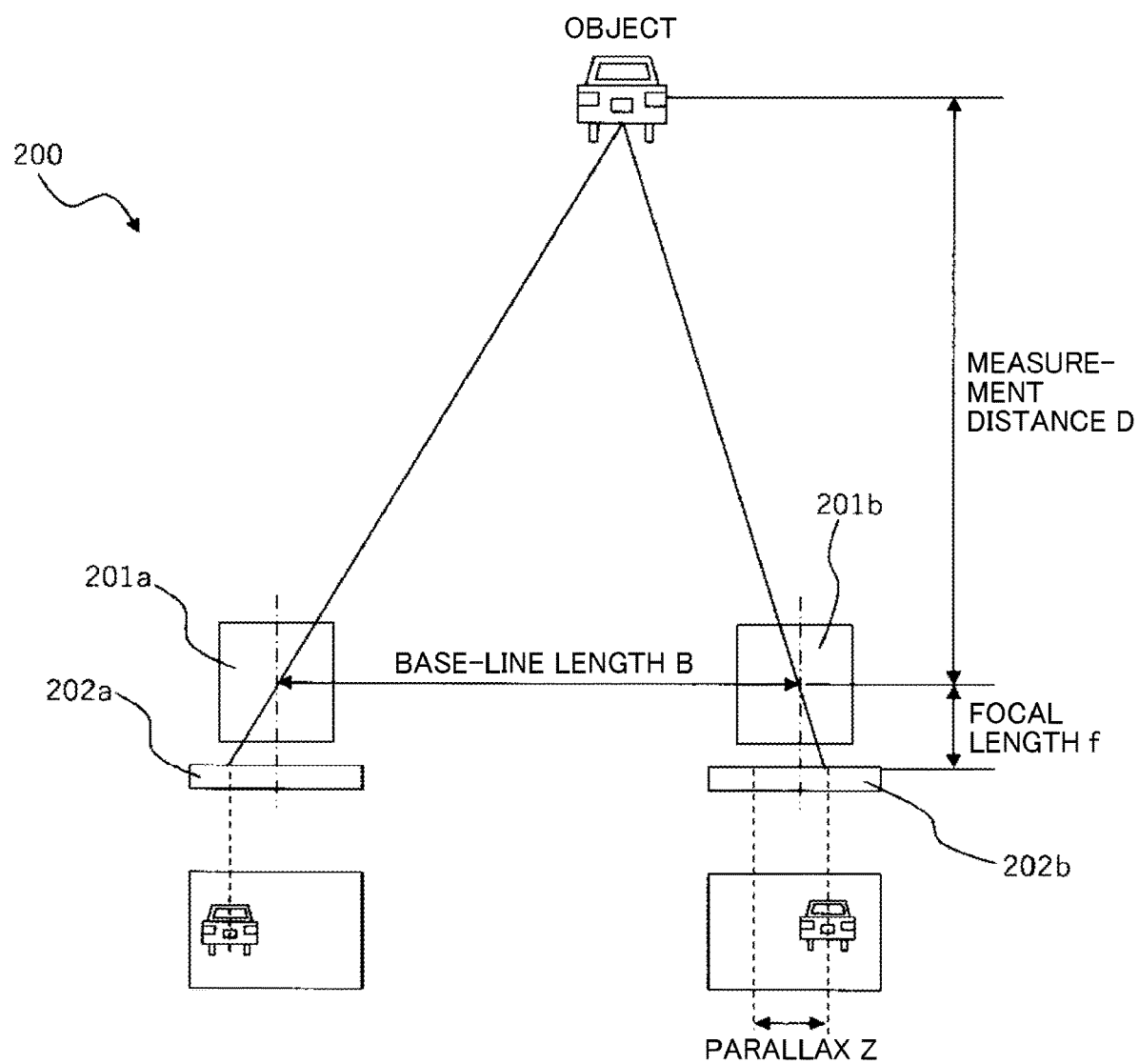
FIG. 29 illustrates the principle of triangulation to measure the distance to an object using the stereo camera in FIG. 28.

FIG. 28 illustrates a configuration of a stereo camera 200 incorporating the imaging optical system 50 according to the present embodiment. FIG. 29 illustrates the principle of triangulation to measure the distance to an object using the stereo camera 200.

As illustrated in FIG. 28, the stereo camera 200 includes two camera apparatuses 200a and 200b. The camera apparatuses 200a and 200b respectively use imaging lenses 201a and 201b each using the imaging optical system 50 according to the present embodiment, and light receiving elements 202a and 202b. The camera apparatuses 200a and 200b may have, for example, a configuration similar to that of the digital camera (the camera apparatus) 100 illustrated in FIGS. 26A, 26B, and 27; however, the camera apparatuses 200a and 200b are not limited thereby. Digital image information output from the camera apparatuses 200a and 200b is subjected to correction or image processing using an image processor or the like provided in the stereo camera 200 and output. Thus, the processed information can be used for a sensing technology such as a manufacturing line or control on a vehicle.

Using the stereo camera 200 can measure the distance from the stereo camera 200 to an object. When the object is image-captured using the camera apparatuses 200a and 200b, objects included in images output from the respective camera apparatuses have a difference, that is, a parallax between the positions of the objects in the images. Referring to FIG. 29, it is obtained that a correlation of D=Bf/Z is established among a parallax Z, a base-line length B (a distance between the camera apparatuses 200a and 200b), a focal length f of each of the imaging lenses 201a and 201b, and a measurement distance D, using the principle of triangulation. That is, the values of the base-line length B and the focal length f are stored in the stereo camera 200 as values belonging to the stereo camera 200. Thus, the parallax Z can be acquired through an arithmetic operation on images, and hence the measurement distance D to the object can be calculated.

However, if a variation in angle of view (a variation in image height) is generated due to a temperature change, the position at which light from the object forms an image is deviated, and the parallax Z involves a deviation. Thus, the measurement distance D calculated through the arithmetic operation using the above expression involves a deviation, appearing as an error in distance measurement. For example, when the imaging optical system 50 is installed in the on-vehicle stereo camera, it may be difficult to highly accurately control the traveling of the vehicle. Thus, suppressing a variation in angle of view (a variation in image height) due to a temperature change is significant for the stereo camera 200. The imaging optical system 50 according to the present embodiment is so suitable to be used in each of the imaging lenses 201a and 201b.

Figure 30:
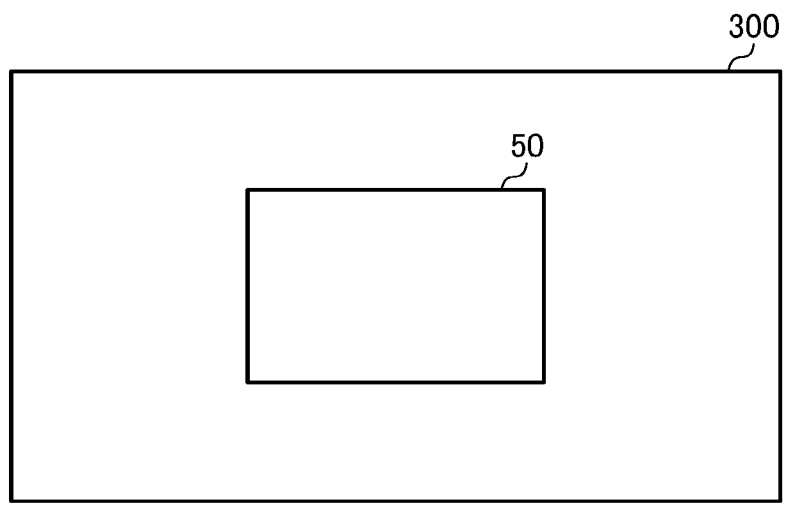
FIG. 30 is a block diagram of a distance measuring incorporating the imaging optical system according to the present embodiment.
Figure 31:
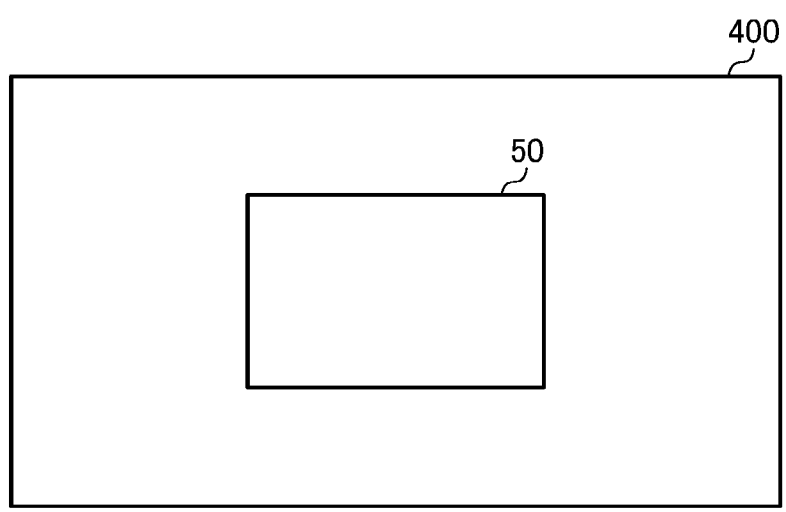
FIG. 31 is a block diagram of a mobile object incorporating the imaging optical system according to the present embodiment.

Referring to FIGS. 26A to 29, the example of applying the imaging optical system 50 according to the present embodiment to the digital camera (the imaging apparatus, the camera apparatus) 100 and the stereo camera 200 has been described. However, the imaging optical system 50 according to the present embodiment can be applied to, for example, at least one of a distance measuring apparatus 300 as illustrated in FIG. 30 and a mobile object 400 (for example, a vehicle) as illustrated in FIG. 31. That is, a subject to which the imaging optical system 50 according to the present embodiment is applied can be freely determined, and various changes can be made in design.

Although the desirable embodiments and examples of the disclosure have been described above, the disclosure is not particularly limited to such specific embodiments and examples unless otherwise particularly limited in the above description, and various modifications and changes can be made without departing from the spirit and scope of the disclosure as set forth in the appended claims. For example, the imaging optical system 50 according to the present disclosure can be used as a projection optical system while "the image side" in the above description is changed to an object side and "the object side" in the above description is changed to an image side. The advantageous effects described in the embodiments and examples of the disclosure are merely desirable advantageous effects generated based on the disclosure. The advantageous effects according to the disclosure are not limited to those described in the embodiments and examples.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An imaging optical system comprising, sequentially from an object side toward an image side:
   a first lens group having one of a positive refractive power and a negative refractive power;
   an aperture stop; and
   a second lens group having a positive refractive power,
   wherein the first lens group includes, sequentially from the object side toward the image side:
     a negative lens having a meniscus shape; and
     a positive lens having a meniscus shape and formed of a plastic lens, and
   wherein the second lens group includes a plastic lens and satisfies Conditional Expressions (1) and (2) as follows:

$$c31a > c32a, \text{ and} \quad (1)$$

$$c31b < c32b, \quad (2)$$

where
$c31a$ is an on-axis curvature of an object-side surface of the plastic lens of the second lens group,
$c32a$ is an on-axis curvature of an image-side surface of the plastic lens of the second lens group, c31b is an off-axis curvature of the object-side surface of the plastic lens of the second lens group, and c32b is an off-axis curvature of the image-side surface of the plastic lens of the second lens group.

2. The imaging optical system according to claim 1, wherein the imaging optical system satisfies Conditional Expressions (3) and (4) as follows:

$$\alpha 2 > 30 \times 10^{-6}, \text{ and} \quad (3)$$

$$\alpha 3 > 30 \times 10^{-6}, \quad (4)$$

where $\alpha 2$ is a coefficient of linear expansion of the positive lens of the first lens group, and $\alpha 3$ is a coefficient of linear expansion of the plastic lens of the second lens group.

3. The imaging optical system according to claim 1, wherein the imaging optical system satisfies Conditional Expressions (5) and (6) as follows:

$$\beta 2 < -50 \times 10^{-6}, \text{ and} \quad (5)$$

$$\beta 3 < -50 \times 10^{-6}, \quad (6)$$

where $\beta 2$ is a temperature coefficient of a refractive index of the positive lens of the first lens group, and $\beta 3$ is a temperature coefficient of a refractive index of the plastic lens of the second lens group.

4. The imaging optical system according to claim 1, wherein the imaging optical system satisfies Conditional Expression (7) as follows:

$$0.2 < \varphi 2a/\varphi 3a < 0.8, \quad (7)$$

where $\varphi 2a$ is an on-axis power of the positive lens of the first lens group, and $\varphi 3a$ is an on-axis power of the plastic lens of the second lens group.

5. The imaging optical system according to claim 1, wherein the imaging optical system satisfies Conditional Expression (8) as follows:

$$\varphi 2a + \varphi 3a < \varphi A, \quad (8)$$

where $\varphi 2a$ is an on-axis power of the positive lens of the first lens group, $\varphi 3a$ is an on-axis power of the plastic lens of the second lens group, and $\varphi A$ is an on-axis power of a whole system of the optical system.

6. The imaging optical system according to claim 1, wherein the imaging optical system satisfies Conditional Expression (9) as follows:

$$|c31a - c32a| < |c31b - c32b|. \quad (9)$$

7. The imaging optical system according to claim 1, wherein the plastic lens of the second lens group is disposed closest to the image side of the second lens group.

8. The imaging optical system according to claim 7, wherein the second lens group includes a negative lens formed of a plastic lens, in addition to the plastic lens disposed closest to the image side of the second lens group.

9. The imaging optical system according to claim 1, wherein the positive lens of the first lens group has a concave surface facing the object side.

10. The imaging optical system according to claim 1, wherein the negative lens of the first lens group is formed of a glass lens.

11. The imaging optical system according to claim 1, wherein the second lens group includes, sequentially from the object side toward the image side, a negative lens, a positive lens, and a positive lens, and the negative lens and the positive lens disposed closest to the image side constitute the plastic lens.

12. The imaging optical system according to claim 1, wherein the second lens group includes, sequentially from the object side toward the image side, a positive lens, a negative lens, and a positive lens, and the negative lens and the positive lens disposed closest to the image side constitute the plastic lens.

13. An imaging apparatus comprising the imaging optical system according to claim 1.

14. A stereo camera comprising the imaging optical system according to claim 1.

15. A distance measuring apparatus comprising the imaging optical system according to claim 1.

16. A mobile object comprising the imaging optical system according to claim 1.

* * * * *